US012164256B2

(12) United States Patent
Matsumoto

(10) Patent No.: US 12,164,256 B2
(45) Date of Patent: Dec. 10, 2024

(54) IMAGE FORMING APPARATUS AND IMAGE FORMING SYSTEM THAT CONVEY SHEETS WHILE SUPPRESSING OCCURRENCES OF JAMS

(71) Applicant: CANON KABUSHIKI KAISHA, Tokyo (JP)

(72) Inventor: So Matsumoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/315,548

(22) Filed: May 11, 2023

(65) Prior Publication Data

US 2023/0367253 A1 Nov. 16, 2023

(30) Foreign Application Priority Data

May 16, 2022 (JP) ................................ 2022-080160

(51) Int. Cl.
*G03G 15/00* (2006.01)
*G03G 15/01* (2006.01)
*G03G 15/23* (2006.01)

(52) U.S. Cl.
CPC ..... *G03G 15/6567* (2013.01); *G03G 15/0131* (2013.01); *G03G 15/23* (2013.01); *G03G 2215/00324* (2013.01); *G03G 2215/00599* (2013.01)

(58) Field of Classification Search
USPC ........................................................ 399/66
See application file for complete search history.

(56) References Cited

U.S. PATENT DOCUMENTS

2006/0239733 A1* 10/2006 Choi .................. G03G 15/6567 399/396
2012/0301198 A1* 11/2012 Momiyama ............ B65H 5/062 271/226
2019/0079445 A1* 3/2019 Wakabayashi ..... G03G 15/6567

FOREIGN PATENT DOCUMENTS

JP 2006290526 A 10/2006

* cited by examiner

*Primary Examiner* — Quana Grainger
(74) *Attorney, Agent, or Firm* — ROSSI, KIMMS & McDOWELL LLP

(57) ABSTRACT

An image forming apparatus includes an accommodating portion, an image forming unit, a skew correcting portion, a conveyance unit, a detection unit, a re-conveyance unit, and a control unit. The control unit controls the re-conveyance unit such that the re-conveyance unit stops a sheet in the second conveyance path temporarily and starts to convey the sheet at a first timing after a second timing and before a third timing, where the second timing is a timing such that if the sheet is started to convey to the first conveyance path at the second timing, the conveyance unit decelerates the conveyance speed when the sheet reaches to the detection unit, and the third timing is a timing such that if the sheet is started to convey to the first conveyance path at the third timing, the conveyance unit decelerates the conveyance speed when the sheet reaches to the skew correcting portion.

12 Claims, 15 Drawing Sheets

IMAGE FORMING APPARATUS AND IMAGE FORMING SYSTEM THAT CONVEY SHEETS WHILE SUPPRESSING OCCURRENCES OF JAMS

BACKGROUND OF THE INVENTION

Field of the Invention

The present invention relates to an image forming apparatus and an image forming system such as a copier, a printer, and a facsimile machine using an electrophotographic method or an electrostatic recording method, or a multifunction peripheral having a plurality of functions thereof.

Description of the Related Art

An image forming apparatus capable of performing duplex printing for printing on each of a first surface and a second surface of a sheet has been proposed (see JP 2006-290526 A). In this image forming apparatus, for example, after the sheet on which an image is formed on the first surface is reversed, the sheet is temporarily stopped in a re-conveyance path, and duplex standby is performed in which the sheet is caused to stand by until re-feeding for forming an image on the second surface of the sheet. In addition, an image forming system has been developed in which a feeding apparatus that externally feeds a sheet to an image forming apparatus is connected to an upstream side of the image forming apparatus in addition to a sheet feed unit having a sheet cassette in the image forming apparatus. By having the sheet feed unit inside and outside the image forming apparatus, it is possible to continuously operate and improve productivity.

In such an image forming apparatus capable of duplex printing or an image forming apparatus in which a sheet feeding apparatus is connected to the outside, there has been an image forming apparatus that performs registration processing as follows in order to suppress misalignment between a sheet and an image. That is, a registration process of temporarily stopping (hereinafter, referred to as pre-registration stop) the sheet fed from the sheet feed unit of the image forming apparatus, the duplex standby position, or the sheet feeding apparatus at a predetermined position and conveying the sheet again in accordance with the image forming timing is executed.

However, in the image forming apparatus described in JP 2006-290526 A, in order to realize the above-described registration processing, for example, it is necessary to perform the pre-registration stop for an amount of time that can absorb the variation in the conveyance timing of the fed sheet. That is, if the time for the pre-registration stop is not sufficiently secured, sheet clogging (jam) may occur. On the other hand, the longer the time for the pre-registration stop, the lower the productivity.

Therefore, an object of the present invention is to provide an image forming apparatus and an image forming system capable of realizing stable conveyance while suppressing occurrence of a jam while securing productivity.

SUMMARY OF THE INVENTION

According to a first aspect of the present invention, an image forming apparatus includes an accommodating portion configured to accommodate a sheet, an image forming unit configured to form an image on a sheet, a skew correcting portion disposed in a first conveyance path of sheet toward the image forming unit and configured to correct a skew of a sheet while conveying the sheet at a first conveying speed, a conveyance unit disposed between the accommodating portion and the skew correcting portion in the first conveyance path and configured to convey a sheet to the skew correcting portion, a detection unit disposed between the accommodating portion and the skew correcting portion in the first conveyance path and configured to detect a sheet conveyed in the first conveyance path, a re-conveyance unit configured to convey a sheet on which an image is formed by the image forming unit in a second conveyance path joining to a portion between the detection unit and the accommodating portion in the first conveyance path while reversing front and back surfaces of the sheet, and a control unit configured to control a conveyance speed of a sheet by the conveyance unit and the re-conveyance unit. The control unit is configured to control the conveyance unit such that the conveyance unit conveys a sheet at a second conveying speed faster than the first conveying speed and decelerates the conveyance speed of the sheet in response to a detection of a leading edge of the sheet by the detection unit. The control unit is configured to control the re-conveyance unit such that the re-conveyance unit stops a sheet on which an image is formed by the image forming unit in the second conveyance path temporarily and starts to convey the sheet at a first timing after a second timing and before a third timing, where the second timing is a timing such that if the sheet stopped in the second conveyance path temporarily is started to convey to the first conveyance path at the second timing, the conveyance unit decelerates the conveyance speed of the sheet when a leading edge of the sheet reaches to the detection unit so as to match a conveyance of the sheet with an image formation by the image forming unit, and the third timing is a timing such that if the sheet stopped in the second conveyance path temporarily is started to convey to the first conveyance path at the third timing, the conveyance unit decelerates the conveyance speed of the sheet when a leading edge of the sheet reaches to the skew correcting portion so as to match a conveyance of the sheet with an image formation by the image forming unit.

According to a second aspect of the present invention, an image forming system includes an image forming apparatus including a first accommodating portion configured to accommodate a sheet, an image forming unit configured to form an image on a sheet, a skew correcting portion disposed in a first conveyance path of sheet toward the image forming unit and configured to correct a skew of a sheet while conveying the sheet at a first conveying speed, a first conveyance unit disposed between the first accommodating portion and the skew correcting portion in the first conveyance path and configured to convey a sheet to the skew correcting portion, and a detection unit disposed between the first accommodating portion and the skew correcting portion in the first conveyance path and configured to detect a sheet conveyed in the first conveyance path, a feeding apparatus including a second accommodating portion configured to accommodate a sheet, and a second conveyance unit including a conveyance roller pair configured to convey a sheet in a third conveyance path joining to a portion between the detection unit and the first accommodating portion in the first conveyance path, and a control unit configured to control a conveying speed of the sheet by the first conveyance unit, and the second conveyance unit. The control unit is configured to control the first conveyance unit such that the first conveyance unit conveys a sheet at a second conveying speed faster than the first conveying speed and decelerates a conveyance speed of the sheet in response to a detection of a leading edge of the sheet by the detection unit. The control unit is configured to control the second conveyance unit such that the second conveyance unit starts to convey a sheet from the second accommodating portion at a fourth timing after a fifth timing, after a rear edge of the sheet conveyed from the second accommodating portion passes through the conveyance roller pair, and before a sixth timing, where the fifth timing is a timing such that if the sheet is started to convey from the second accommodating portion to the first conveyance path at the fifth timing, the first conveyance unit decelerates the conveyance speed of the sheet when a leading edge of the sheet reaches to the detection unit so as to match a conveyance of the sheet with an image formation by the image forming unit, and the sixth timing is a timing such that if the sheet is started to convey from the second accommodating portion to the first conveyance path at the sixth timing, the first conveyance unit decelerates the conveyance speed of the sheet when a leading edge of the sheet reaches to the skew correcting portion so as to match a conveyance of the sheet with an image formation by the image forming unit.

Further features of the present invention will become apparent from the following description of exemplary embodiments with reference to the attached drawings.

DESCRIPTION OF THE EMBODIMENTS

First Embodiment

Figure 1:
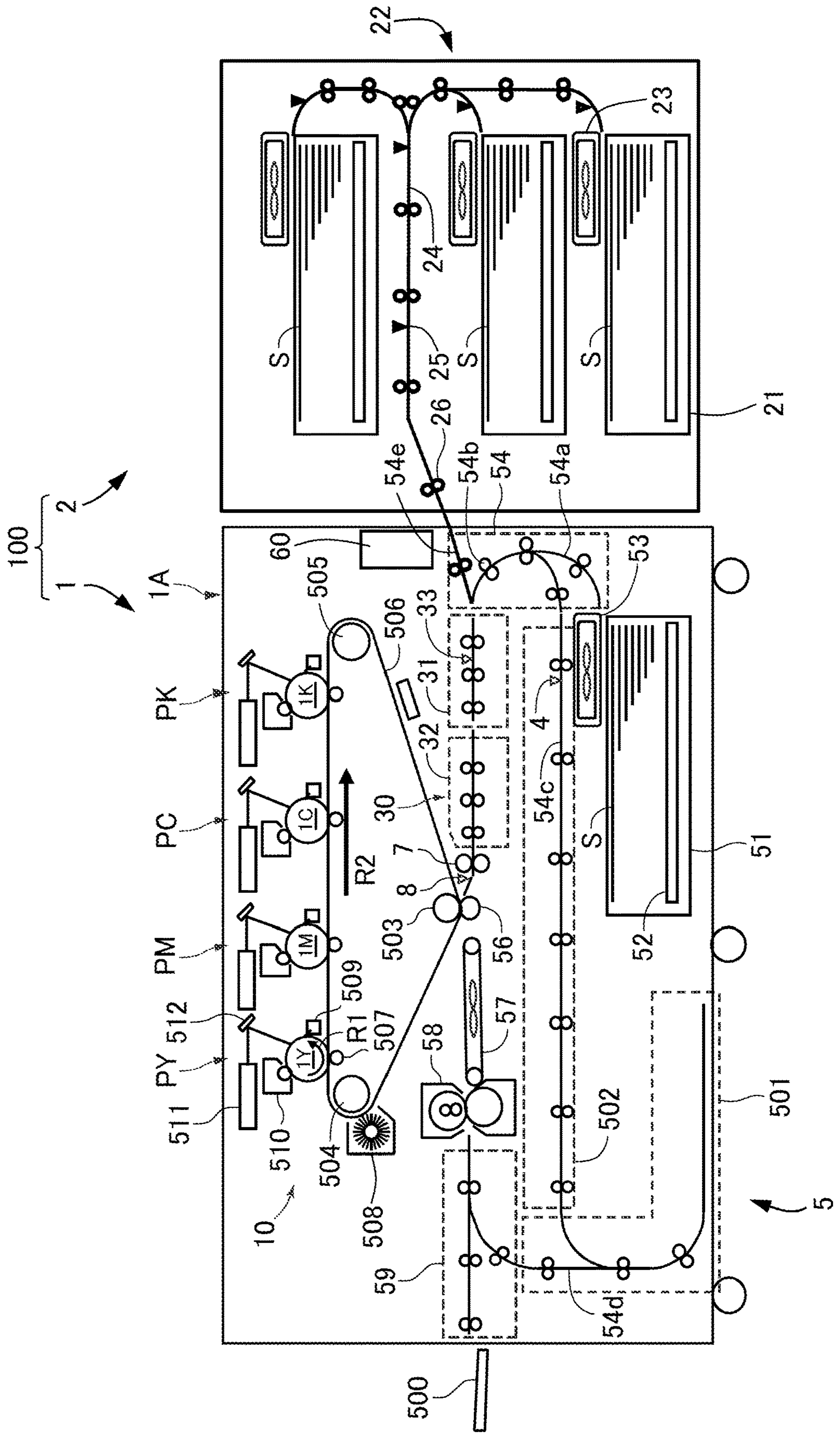
FIG. 1 is a schematic view illustrating an image forming system according to a first embodiment.

Hereinafter, a first embodiment of the present invention will be described in detail with reference to FIGS. 1 to 7. As illustrated in FIG. 1, an image forming system 100 includes an image forming apparatus 1 and a sheet feeding apparatus 2. The image forming apparatus 1 includes a printer, a copier, a facsimile, and a multifunction peripheral, and forms an image on a sheet used as a recording medium on the basis of image information input from an external PC or image information read from a document. In the present embodiment, an electrophotographic full-color laser printer is employed as the image forming apparatus 1. In the image forming apparatus 1 of the present embodiment, an electrophotographic full-color laser printer is employed, but for example, an image forming apparatus including an inkjet type image forming unit instead of the electrophotographic type may be used.

Outline of Image Forming Apparatus

The image forming apparatus 1 is, for example, a POD machine capable of supporting printing other than general office use, and various sheets such as paper such as paper and an envelope, glossy paper, a plastic film such as a sheet for an overhead projector (OHT), and cloth can be used as a recording medium. An apparatus body 1A of the image forming apparatus 1 stores a sheet cassette 51 that stores the sheet S, and an image forming engine 10 that forms an image on the sheet S fed from the sheet cassette 51. The image forming engine 10, which is an example of an image forming unit, is a tandem type intermediate transfer system including four image forming units PY, PM, PC, and PK that form toner images of yellow, magenta, cyan, and black, and an intermediate transfer belt 506 that is an intermediate transfer body. The image forming units PY to PK are electrophotographic units having photosensitive drums 1Y, 1M, 1C, and 1K which are photosensitive members, respectively. The intermediate transfer belt 506 is an example of an image bearing member that bears an image.

Since the image forming units PY to PK are configured in the same manner except that the colors of the toners used for development are different, the configuration of the image forming unit and the toner image forming process (image forming operation) will be described using the yellow image forming unit PY as an example. The image forming unit PY includes an exposing unit 511, a developing unit 510, and a drum cleaner 509 in addition to the photosensitive drum 1Y. The photosensitive drum 1Y is a drum-shaped photosensitive member having a photosensitive layer on an outer peripheral portion, and rotates in a direction (arrow R1) along a rotation direction (arrow R2) of the intermediate transfer belt 506. The surface of the photosensitive drum 1Y is charged by being supplied with electric charge from a charging unit such as a charging roller. The exposing unit 511 emits laser light modulated according to image information, and draws an electrostatic latent image on the surface of the photosensitive drum 1Y by scanning the photosensitive drum 1Y with an optical system including a reflection device 512. The developing unit 510 stores a developer containing toner and supplies the toner to the photosensitive drum 1Y to develop the electrostatic latent image into a toner image. The toner image formed on the photosensitive drum 1Y is primarily transferred to the intermediate transfer belt 506 at a primary transfer portion which is a nip portion between the primary transfer roller 507 which is a primary transfer device and the intermediate transfer belt 506. The residual toner remaining on the photosensitive drum 1Y after the transfer is removed by the drum cleaner 509.

The intermediate transfer belt 506 is wound around a driving roller 504, a driven roller 505, a secondary transfer inner roller 503, and a primary transfer roller 507, and is rotationally driven in a clockwise direction (arrow R2) in the drawing by the driving roller 504. The above-described image forming operation is performed in parallel in each of the image forming units PY to PK, and the toner images of the four colors are multi-layer transferred so as to overlap each other, whereby a full-color toner image is formed on the intermediate transfer belt 506. The toner image is borne on the intermediate transfer belt 506 and conveyed to the secondary transfer portion. The secondary transfer portion is configured as a nip portion between the secondary transfer roller 56 and the secondary transfer inner roller 503, and the toner image is secondarily transferred to the sheet S by applying a bias voltage having a polarity opposite to the charging polarity of the toner to the secondary transfer roller 56. That is, the secondary transfer roller 56 is an example of a transfer unit that transfers the image of the intermediate transfer belt 506 onto the sheet S. Residual toner remaining on the intermediate transfer belt 506 after the transfer is removed by a belt cleaner 508.

The sheet S to which the toner image has been transferred is delivered to a fixing unit 58 by a pre-fixing conveyance unit 57. The fixing unit 58 includes a fixing roller pair that nips and conveys the sheet S and a heat source such as a halogen heater, and heats and pressurizes the toner image borne on the sheet S. As a result, the toner particles are melted and fixed to obtain a fixed image fixed to the sheet S.

Sheet Feeding System of Image Forming Apparatus

Next, the configuration and operation of a sheet conveying system that feeds the sheet S stored in the sheet cassette 51 and discharges the sheet S on which an image is formed to the outside of the apparatus body will be described. The sheet conveying system roughly includes a conveyance unit 54, a registration unit 30, a branch conveyance unit 59, and a re-conveyance unit 5.

The sheet cassette 51 is attached to the apparatus body 1A in a pullable manner, and the sheets S loaded on a lifting plate 52 that can be raised and lowered are fed one by one by the sheet feed unit 53. Examples of the sheet feed unit 53 include a belt system (see FIG. 1) in which the sheet S is separated and attracted to a belt member by a suction fan and conveyed, and a friction separation system using a roller or a pad. The conveyance unit 54 is an example of a conveyance unit that forms a feeding path 54*a* which is a first conveyance path from the sheet cassette 51 toward the image forming engine 10 and conveys a sheet in the feeding path 54*a*. The sheet S fed from the sheet feed unit 53 is conveyed along the feeding path 54*a* by the conveyance roller pair 54*b* of the conveyance unit 54, and is delivered to the registration unit 30.

The registration unit 30 includes a pre-registration conveyance unit 31, a skew correcting portion 32, and a registration roller 7 which is a registration roller pair, and corrects skew of the sheet S to convey the sheet S toward the secondary transfer portion. The pre-registration conveyance unit 31 includes, for example, three conveyance roller pairs, and each conveyance roller pair feeds the sheet S in the sheet conveying direction. A sheet sensor 33 that detects the leading edge of the sheet S is disposed in the pre-registration conveyance unit 31. That is, the sheet sensor 33 is disposed between the sheet cassette 51 and the skew correcting portion 32 in the feeding path 54*a*, and detects the sheet S conveyed in the feeding path 54*a*. As the sheet sensor 33, for example, a reflective photoelectric sensor including a light emitting unit and a light receiving unit can be used. In this case, light emitted by the light emitting unit is reflected by the sheet S that has reached the detection position, and the light receiving unit detects the reflected light, whereby the passage timing of the sheet S is detected. The delay time of the sheet S is measured based on the detection result from the sheet sensor 33, the conveying speed of the sheet S in the pre-registration conveyance unit 31 is changed according to the delay time, and the sheet is conveyed to the skew correcting portion 32 after the delay time is canceled. This control will be described below.

The skew correcting portion 32 is a sheet alignment device of a side registration system including a reference member and, for example, three obliquely conveyance rollers. That is, the skew correcting portion 32 is disposed in the feeding path 54*a* toward the image forming engine 10 and configured to correct a skew of a sheet while conveying the sheet at a first conveying speed lower than the second conveying speed in the conveyance unit 54. The conveying speed in the skew correcting portion 32 is a speed that matches the timing of the image transferred by the secondary transfer roller 56. The sheet S is fed to the secondary transfer portion after the skew correction is performed in the skew correcting portion 32.

The sheet S to which the toner image has been transferred in the secondary transfer portion and to which the image has been fixed by the fixing unit 58 is conveyed to the branch conveyance unit 59 having a switching member capable of switching the conveyance path of the sheet S. When the image formation on the sheet S is completed, the sheet S is discharged to a sheet discharge tray 500 disposed outside the apparatus body 1A by a sheet discharge roller pair.

When an image is formed on the back surface of the sheet S, the sheet S is conveyed to the re-conveyance unit 5. The re-conveyance unit 5 includes a reverse conveyance unit 501 and a duplex conveyance unit 502, and reverses and conveys a sheet on which an image is formed by the image forming engine 10, and joins the sheet between the sheet sensor 33 and the sheet cassette 51 in the feeding path 54*a*. The re-conveyance unit 5 includes a reverse conveyance path

54*d* that is a reverse path for reversing the conveying direction of the sheet, and the re-conveyance path 54*c* that is a second conveyance path. The re-conveyance path 54*c* joins the sheet conveyed from the reverse conveyance path 54*d* between the sheet sensor 33 and the sheet cassette 51 in the feeding path 54*a*.

The sheet S conveyed from the branch conveyance unit 59 is delivered to the duplex conveyance unit 502 having the re-conveyance path 54*c* via the reverse conveyance unit 501 having the reverse conveyance path 54*d*. The reverse conveyance unit 501 includes a reverse conveyance roller pair capable of normal rotation and reverse rotation, switches back the sheet S, and delivers the sheet S to the duplex conveyance unit 502. The leading edge of the sheet S conveyed to the duplex conveyance unit 502 is detected by the detection unit 4 that is provided in the re-conveyance path 54*c* and detects the leading edge of the sheet S, the sheet S is stopped in the re-conveyance path 54*c*, and the sheet S is on standby until re-feeding for forming an image on the second surface (duplex standby). As the detection unit 4, for example, an optical sensor can be employed similarly to the sheet sensor 33. The duplex conveyance unit 502 conveys the sheet S toward the pre-registration conveyance unit 31 in accordance with the image forming timing of the second surface. That is, the re-conveyance unit 5 temporarily stops the sheet in the re-conveyance path 54*c* and then starts conveyance toward the skew correcting portion 32. After an image is formed on the back surface of the sheet S, the sheet S is discharged to the sheet discharge tray 500.

Figure 2:
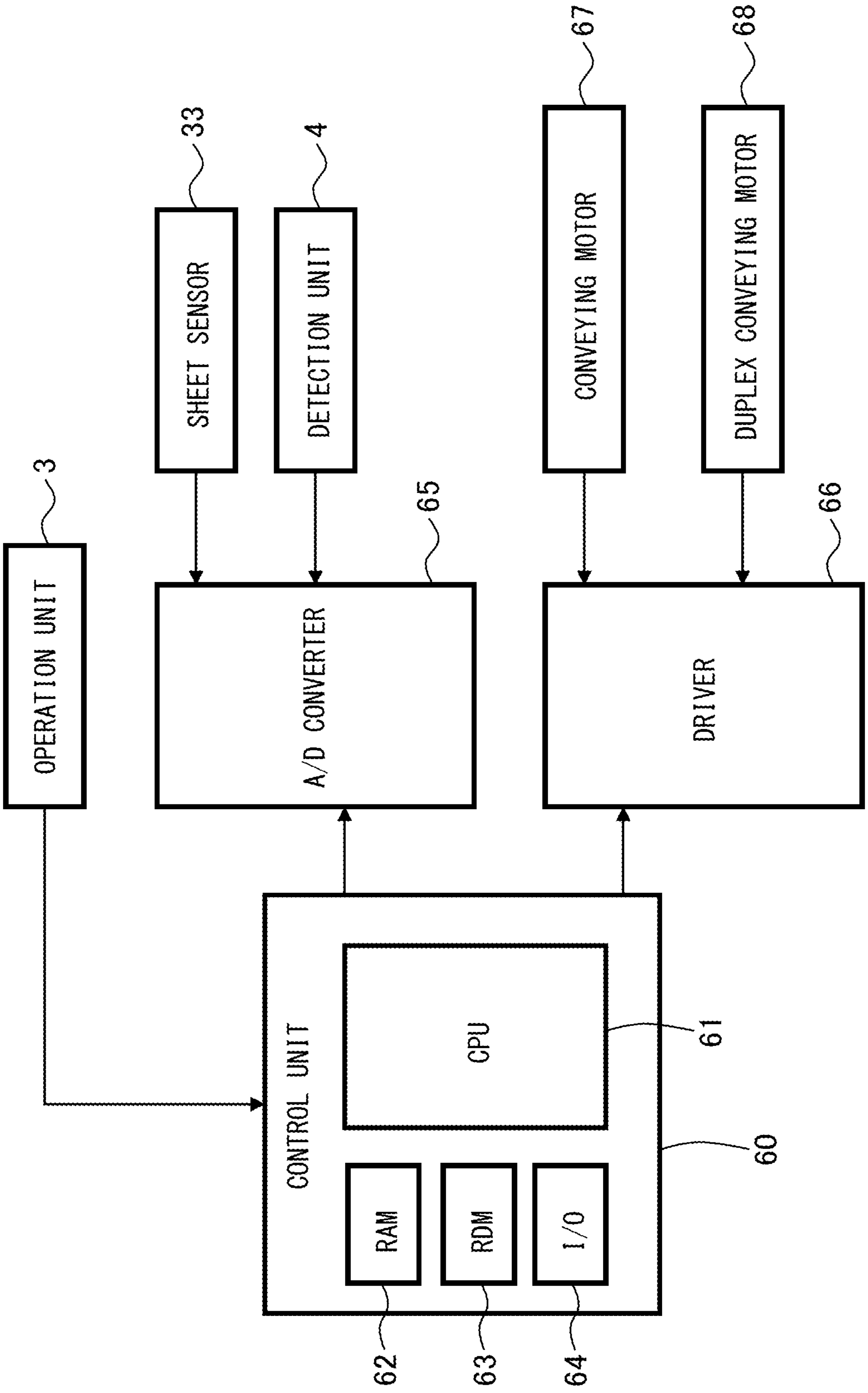
FIG. 2 is a block diagram illustrating a control system according to the first embodiment.

The image forming apparatus 1 includes a control unit 60. As illustrated in FIG. 2, the control unit 60 includes a CPU (central processing unit) 61, a RAM 62 which is a rewritable memory, a ROM 63 which is a read-only memory, and an I/O 64 which is an interface for an external device or a network. The CPU 61 performs control on the basis of information input via the operation unit 3 which is a user interface and detection signals input from the sheet sensor 33 and the detection unit 4 via an A/D converter 65. The CPU 61 reads and executes a program stored in the ROM 63 or the like, and drives and controls a conveying motor 67 which is an actuator of the registration unit 30 and a duplex conveying motor 68 of the duplex conveyance unit 502 via a driver 66. The control unit 60 controls the conveying speed of the sheet by the conveyance unit 54 and the re-conveyance unit 5 by driving control of the conveying motor 67 and the duplex conveying motor 68.

Sheet Feeding Apparatus

As illustrated in FIG. 1, a sheet feeding apparatus 2, which is an example of a sheet feeding apparatus, is connected to an upstream side of a conveyance path 54*e* of the image forming apparatus 1. In the sheet feeding apparatus 2, three sheet cassettes 21 and three sheet feed units 23 having the same configuration as the sheet cassette 51 of the image forming apparatus 1 are provided side by side in the vertical direction, and the sheets S contained in the respective sheet cassettes 21 are fed by the sheet feed unit 23. Each of the sheet cassettes 21 is an example of a second accommodating portion that accommodates the sheet S.

Similarly to the image forming apparatus 1, the sheet S is fed by the sheet feed unit 23 in accordance with the image forming timing of the image forming apparatus 1. The sheet S is conveyed by the conveyance unit 22 along a horizontal path 24 toward the image forming apparatus 1. The conveyance unit 22 is an example of a second conveyance unit that forms the horizontal path 24 as a second conveyance path joining from the sheet cassette 51 to a portion between the sheet sensor 33 and the sheet cassette 21 in the feeding path 54*a*. The conveyance unit 22 includes at least one conveyance roller pair 26 that conveys the sheet S in the horizontal path 24.

A detection unit 25 that detects the leading edge of the sheet S is disposed in the horizontal path 24. As the detection unit 25, for example, an optical sensor can be employed similarly to the sheet sensor 33. When the leading edge of the sheet S is detected by the detection unit 25, the sheet S is temporarily stopped. Then, the sheet is re-fed in accordance with the image forming timing of the image forming apparatus 1, and the sheet S is conveyed to the image forming apparatus 1. As a result, it is possible to correct variations in conveyance timing occurring in the sheet feed unit 23. Note that the sheet feed unit 23 and the conveyance unit 22 of the sheet feeding apparatus 2 can be controlled by the control unit 60 of the image forming apparatus 1.

Speed Control

Figure 3:
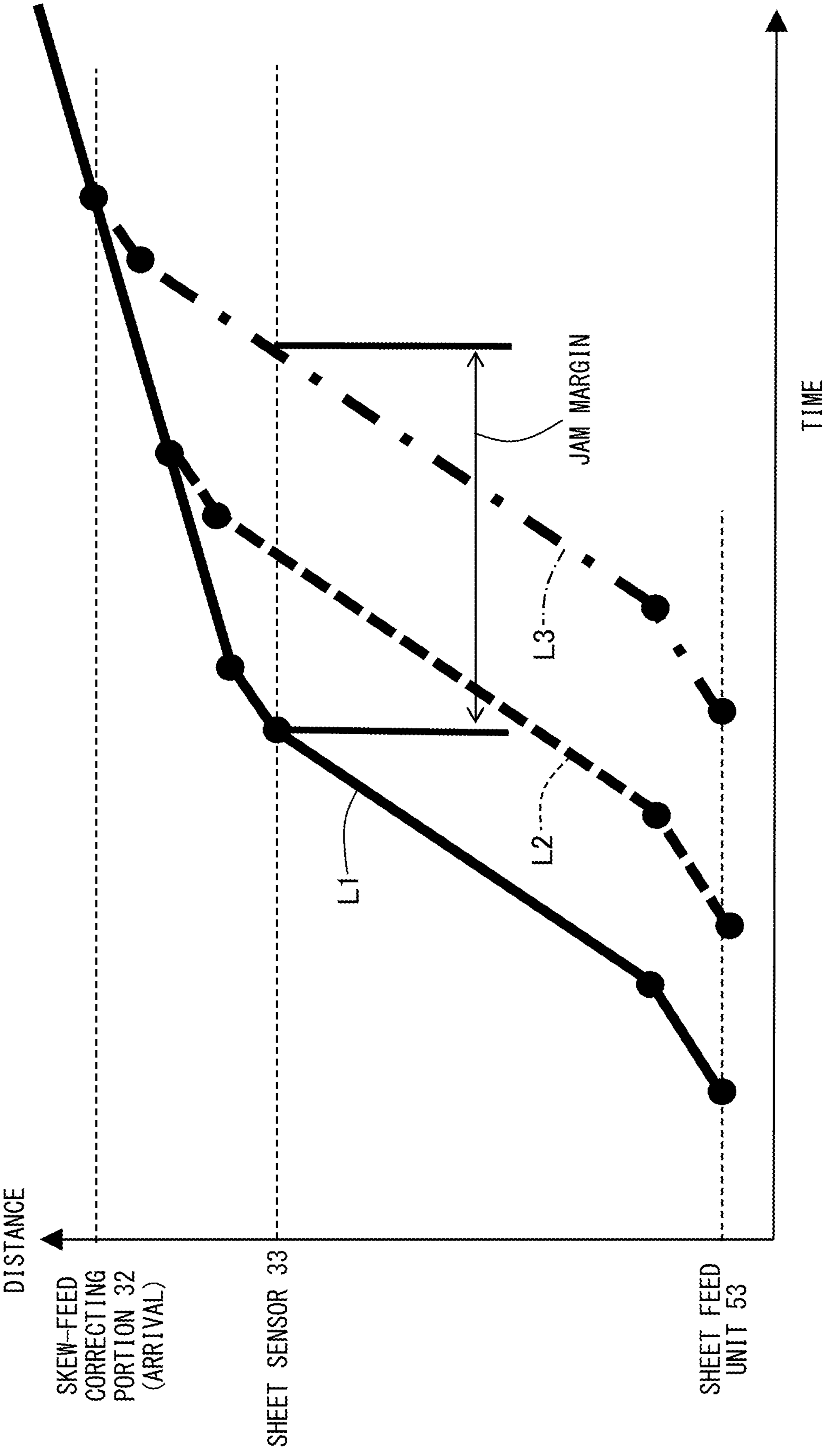
FIG. 3 is a diagram illustrating a conveying distance of a sheet when the sheet is fed from a sheet feed unit of the image forming apparatus according to the first embodiment.

Next, the speed control for recovering the delay of the sheet S will be described in detail. FIG. 3 illustrates a diagram of the leading edge of the sheet in which the horizontal axis represents time and the vertical axis represents distance (position). In the present description, the movement of the sheet S fed from the sheet feed unit 53 provided inside the image forming apparatus 1 will be described as an example. As a premise, the transfer timing in the secondary transfer portion is set, the sheet S needs to be conveyed in accordance with the transfer timing, and the sheet is fed from the sheet feed unit 53 in order to meet the transfer timing.

The solid line represents an ideal diagram without delay (hereinafter, referred to as a reference line L1). The sheet S fed from the sheet feed unit 53 is compared with an ideal timing (reference line L1) with no delay in the sheet sensor 33 provided in the pre-registration conveyance unit 31. If there is no delay with respect to the ideal timing, the deceleration operation is immediately performed, and the sheet is conveyed to the downstream skew correcting portion 32 with the decelerated speed.

If a delay has occurred (for example, the delay line L2 indicated by a broken line), the conveyance is performed while maintaining a high speed without immediately decelerating, the sheet is decelerated at a timing delayed from the deceleration timing of the reference line L1, and the sheet is joined to the reference line L1. That is, in a case where a delay occurs, the delay is recovered by increasing the conveying distance at a high speed.

In addition, a dashed-dotted line indicates the maximum delay line L3. The maximum delay line L3 defines a position to which it is necessary to recover the delay, and indicates a case where the sheet reached the sheet sensor 33 at the final timing at which the recovery can be achieved. In the present embodiment, it is defined that it is necessary to recover the delay before reaching the skew correcting portion 32, and the maximum delay line L3 is defined. That is, since it is sufficient that the deceleration is completed before the sheet reaches the skew correcting portion 32, the point at which deceleration is performed at the maximum delay line L3 is set to a point at which the skew correcting portion 32 is reached.

In this manner, even if there is a delay in the timing of reaching the sheet sensor 33, the delay can be recovered by changing the deceleration timing, and the delay can be canceled at the timing of reaching the skew correcting portion 32. In addition, a range representing how much the recovery can be achieved at the maximum delay at that time is referred to as a jam margin, and this jam margin is defined by a difference in timing at which the reference line L1 and the maximum delay line L3 illustrated in FIG. 3 reach the sheet sensor 33. That is, recovery can be achieved even if the delay is performed by the jam margin.

The above is the details of the control for recovering the delay by the speed control. Note that the example of the movement of the sheet S fed from the sheet feed unit 53 inside the image forming apparatus 1 has been described so far. Next, current problems in the case of duplex conveyance and control of the present disclosure will be described in detail.

Conventional Problems in Duplex Conveyance and Control of Present Disclosure

Figure 4:
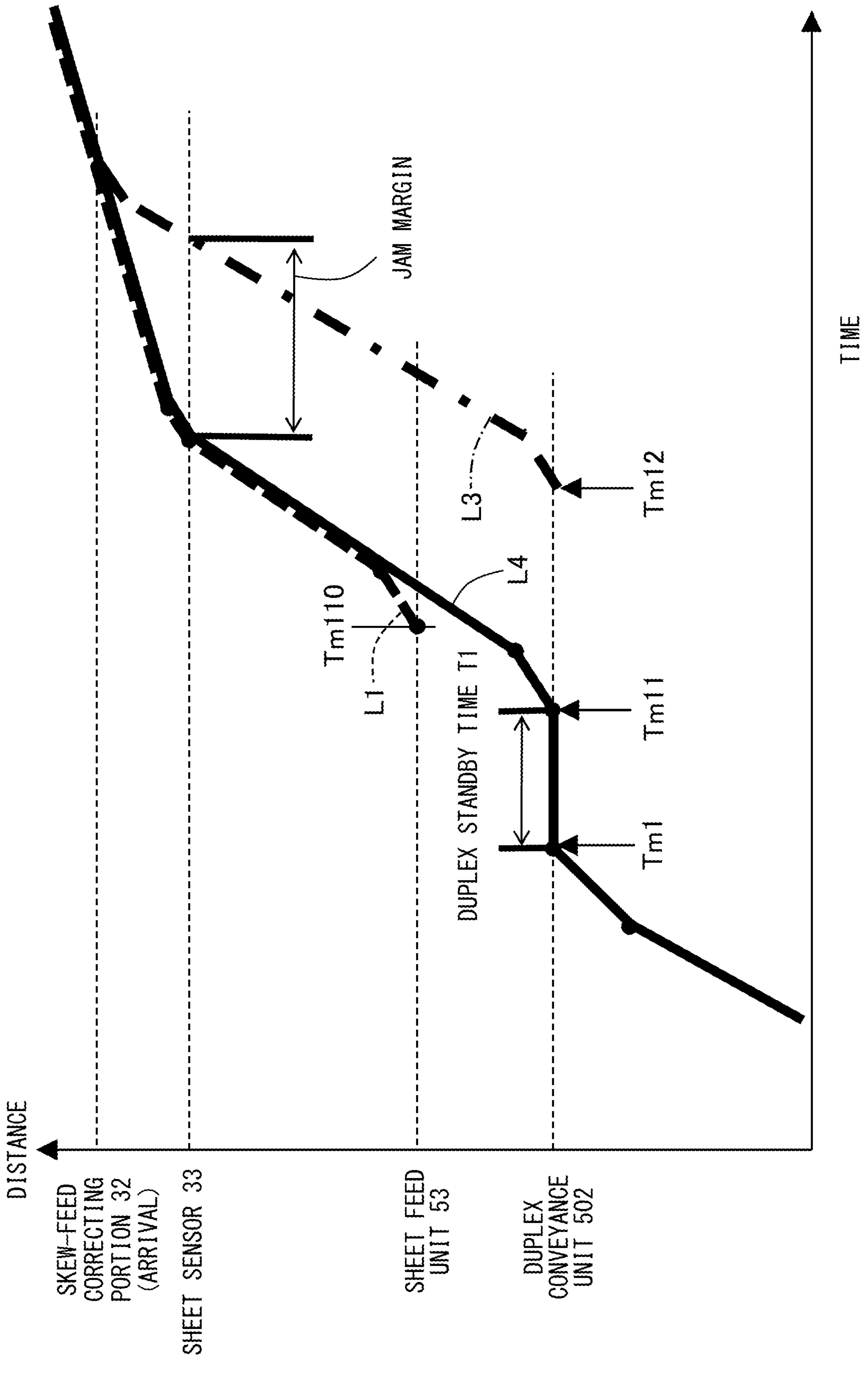
FIG. 4 is a diagram illustrating a conveying distance of a sheet in a case where a sheet re-fed from a duplex conveyance unit of the image forming apparatus according to the first embodiment, and illustrates a case where a duplex standby time is short.
Figure 5:
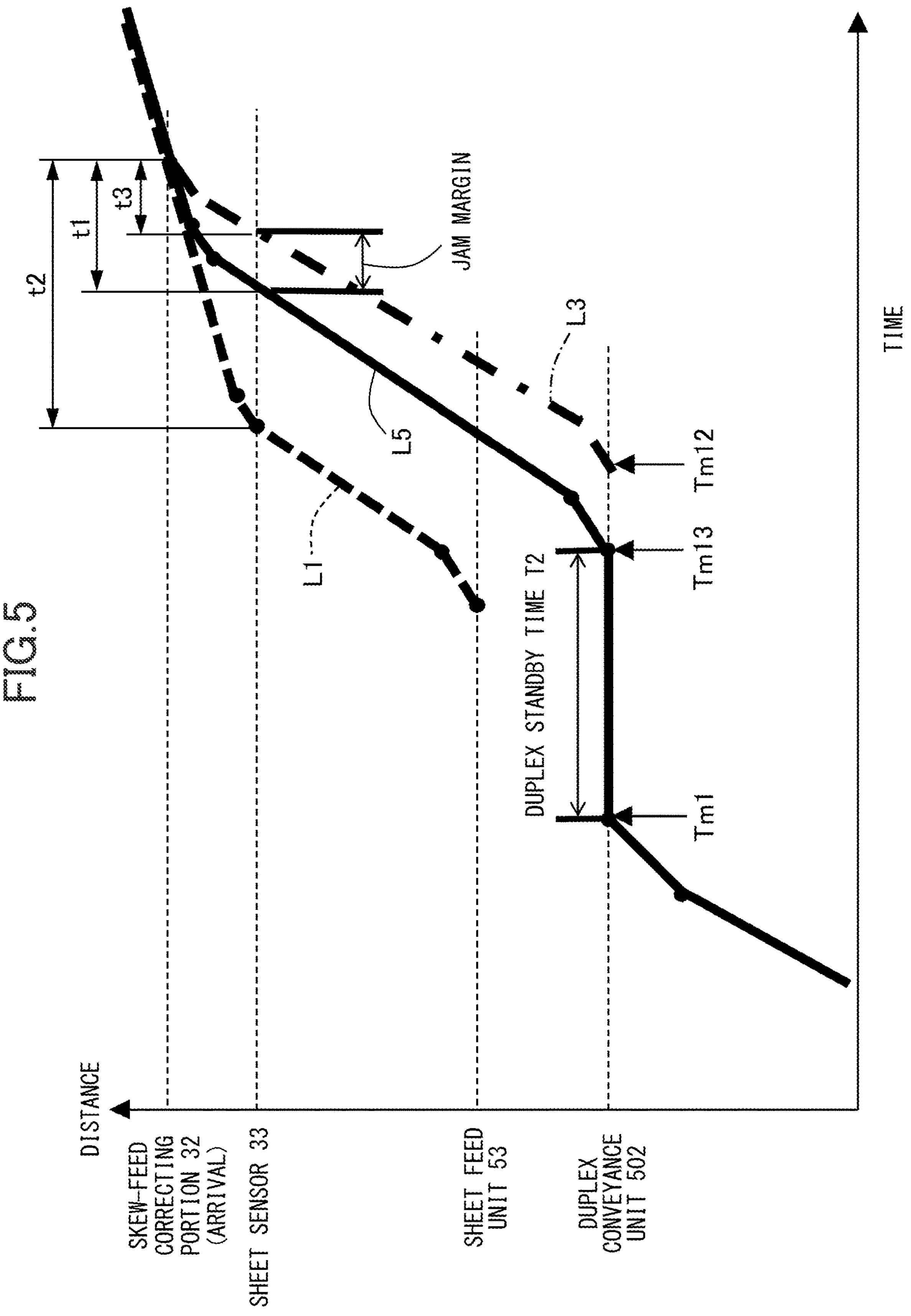
FIG. 5 is a diagram illustrating a conveying distance of a sheet in a case where a sheet is re-fed from a duplex conveyance unit of the image forming apparatus according to the first embodiment, and illustrates a case where a duplex standby time is long.

FIG. 4 illustrates a diagram of the conventional configuration during duplex conveyance, and FIG. 5 illustrates a diagram of the first embodiment of the present invention. In these drawings, a dotted line is the reference line L1 of the sheet S fed from the sheet feed unit 53 of the image forming apparatus 1 described above, a solid line is a diagram at the time of re-feeding from the duplex conveyance unit 502, and a dashed-dotted line is the maximum delay line L3, which are superimposed and displayed for comparison.

In the conventional control illustrated in FIG. 4, the timing of re-feeding from the duplex conveyance unit 502 is set so that the sheet reaches the sheet sensor 33 along the reference line L1 fed from the sheet feed unit 53 of the image forming apparatus 1 described above (duplex line L4). As a result, the sheet fed from the duplex conveyance unit 502 is also conveyed to the skew correcting portion 32 in a state of having a jam margin similar to that of the sheet feed unit 53 of the image forming apparatus 1.

Here, since the sheet is fed at a timing at which an image is appropriately formed on the sheet, the timing Tm11 at which the sheet is re-fed from the duplex conveyance unit 502 is a timing that is determined naturally when an image forming operation is performed. On the other hand, the timing Tm1 is a timing at which the image of the first surface is formed, the sheet is reversed and conveyed around the inside of the apparatus via the re-conveyance path 54*c*, the leading edge of the sheet is detected by the detection unit 4, and the sheet is temporarily stopped in the re-conveyance path 54*c*. Thereafter, the sheet is stopped and stands by until the sheet is re-fed. The stopping time is referred to as a duplex standby time T1.

If the sheet having made one turn inside the apparatus does not meet the re-feeding timing Tm11 in the duplex conveyance unit 502, the re-feeding may not be performed and a jam may occur. Therefore, in order to meet the re-feeding timing Tm11 even in a case where the sheet having made one turn inside the apparatus is delayed and reaches the re-conveyance path 54*c* with a delay, the duplex standby time T1 needs to be secured in advance to be equal to or longer than the maximum delay time of the sheet having made one turn inside the apparatus. As described above, in the case of duplex printing, it is important to secure the duplex standby time T1, but it can be said that it is difficult to secure this time in order to achieve high productivity. This is because, since the timing Tm11 is set in time for image formation, it is desired to make the re-feeding timing Tm11 earlier in order to achieve high productivity, and this is contrary to securing the duplex standby time T1. The above is the current problem.

On the other hand, the present embodiment realizes a configuration for securing a duplex standby time while maintaining high productivity, which will be described with reference to FIG. 5. Here, attention is focused on duplex re-feeding timing. In the conventional control, the duplex re-feeding timing is controlled so that the sheet is conveyed to the sheet sensor 33 that detects the delay time at the same timing as the sheet feed unit 53 of the image forming apparatus 1. As a result, the jam margin of the sheet fed from the sheet feed unit 53 and the duplex conveyance unit 502 of the image forming apparatus 1 can be uniformly secured by the same amount. However, the sheet conveyed from the duplex conveyance unit 502 has a characteristic of having a shorter delay time than the sheet conveyed from the sheet feed unit 53 of the image forming apparatus 1. The reason is as follows.

The sheet feed unit 53 of the image forming apparatus 1 employs a sheet feeding method using air, which includes a process of attracting a sheet floated by air to a belt for conveying the sheet by suction using air in a process of conveying the sheet downstream. This attraction is characterized in that the attraction timing is less likely to be stabilized due to variations in the floating state of the sheet, and as a result, the feeding timing is likely to be delayed.

On the other hand, in order to convey the sheet re-fed from the duplex conveyance unit 502, after a command to re-feed the sheet is issued, only the duplex conveying motor 68 is driven to rotate the roller held in advance. Therefore, since conveyance is performed with a delay of only a soft processing-related delay, the delay of the feeding timing is small. That is, conventionally, the jam margin of the sheet fed from the duplex conveyance unit 502 is uniformly provided similarly to the sheet feed unit 53 of the image forming apparatus 1, but it can be said that the jam margin is excessively provided for the above-described reason. Therefore, in the present embodiment, the feeding timing Tm13 from the duplex conveyance unit 502 is intentionally delayed from the conventional timing Tm11, so that the duplex standby time T2 can be secured longer than the duplex standby time T1 of the conventional control (duplex line L5). As a result, the jam margin is reduced, but the duplex re-feeding has a small delay time as described above, and thus the overall apparatus can be controlled.

As described above, by relatively advancing the feeding timing from the sheet feed unit 53 of the image forming apparatus 1 having a long delay time, the timing to reach the sheet sensor 33 that measures the delay time is advanced, and the jam margin that can be recovered by the speed control is increased. On the other hand, in the re-feeding from the duplex conveyance unit 502 in which the delay time is short and the jam margin due to the speed control is small, by relatively delaying the feeding timing, the timing of reaching the sheet sensor 33 is delayed. As a result, it is possible to secure a longer duplex standby time than in the conventional control, and it is possible to prevent a jam in which a sheet that has made one turn does not meet re-feeding from the duplex conveyance unit 502.

Here, the control unit 60 is configured to control the conveyance unit 54 such that the conveyance unit 54 conveys a sheet at the second speed faster than the first speed and decelerates the conveyance speed of the sheet in response to a detection of a leading edge of the sheet by the detection unit 4. Furthermore, in the present embodiment, as illustrated in FIG. 4, the movement represented by the reference line L1 is performed by setting the timing to start the conveyance of the sheet to a second timing Tm11 so that the sheet is decelerated and conveyed to the skew correcting portion 32 when the leading edge of the sheet passes through the sheet sensor 33. That is, the second timing Tm11 is a timing such that if the sheet stopped in the re-conveyance path 54*c* temporarily is started to convey to the feeding path 54*a* at the second timing Tm11, the conveyance unit 54 decelerates the conveyance speed of the sheet when the leading edge of the sheet reaches to the detection unit 4 so as to match a conveyance of the sheet with an image formation by the image forming units PY to PK. In the present embodiment, the time when the leading edge of the sheet passes through the sheet sensor 33 is also the time when the leading edge of the sheet is detected by the sheet sensor 33. In addition, the movement represented by the maximum delay line L3 is performed by setting the timing to start the conveyance of the sheet to the second timing Tm11 after a third timing Tm12 so that the sheet is decelerated when the leading edge of the sheet reaches the skew correcting portion 32 after passing through the sheet sensor 33. That is, the third timing Tm12 is a timing such that if the sheet stopped in the re-conveyance path 54*c* temporarily is started to convey to the feeding path 54*a* at the third timing Tm12, the conveyance unit 54 decelerates the conveyance speed of the sheet when the leading edge of the sheet reaches to the skew correcting portion 32 so as to match a conveyance of the sheet with an image formation by the image forming units PY to PK. Further, as illustrated in FIG. 5, the movement represented by the duplex line L5 is performed by setting the timing to start the conveyance of the sheet to the first timing Tm13 so that the sheet is decelerated and conveyed to the skew correcting portion 32 before reaching the skew correcting portion 32 after the leading edge of the sheet passes through the sheet sensor 33. The first timing Tm13 is after the second timing Tm11 and before the third timing Tm12. In the present embodiment, the timing at which the re-conveyance unit 5 temporarily stops the sheet on which the image is formed in the image forming engine 10 and then starts conveyance toward the skew correcting portion 32 is set as the first timing Tm13. That is, the control unit 60 is configured to control the re-conveyance unit 5 such that the re-conveyance unit 5 stops the sheet on which an image is formed by the image forming units PY to PK in the re-conveyance path 54*c* temporarily and starts to convey the sheet at the first timing Tm13 after the second timing Tm11 and before a third timing Tm12.

Furthermore, in the present embodiment, the first timing Tm13 is set a predetermined time before the third timing Tm12 by the jam margin. As a result, it is possible to secure a jam margin and prepare for an unexpected delay. In the present embodiment, the timing at which the conveyance of the sheet stored in the sheet feed unit 53 toward the skew correcting portion 32 is started is set as the timing Tm110 at which the movement represented by the reference line L1 occurs similarly to the case where the sheet is fed from the duplex conveyance unit 502 at the second timing Tm11.

In addition, as illustrated in FIG. 5, in a case where the movement represented by the reference line L1 is performed, the time from the time when the leading edge of the sheet passes through the sheet sensor 33, that is, the time when the leading edge is detected by the sheet sensor 33 to the time when the leading edge reaches and enters the skew correcting portion 32 is t2. Similarly, in a case where the movement represented by the maximum delay line L3 is performed, the time from the time when the leading edge of the sheet passes through the sheet sensor 33 to the time when the leading edge of the sheet reaches and enters the skew correcting portion 32 is t3. In addition, in a case where the movement represented by the duplex line L5 is performed, the time from the time when the leading edge of the sheet passes through the sheet sensor 33 to the time when the sheet reaches and enters the skew correcting portion 32 is t1. In this case, a relationship of $t3<t1<t2$ is satisfied, and the jam margin is $t1-t3$.

Figure 6:
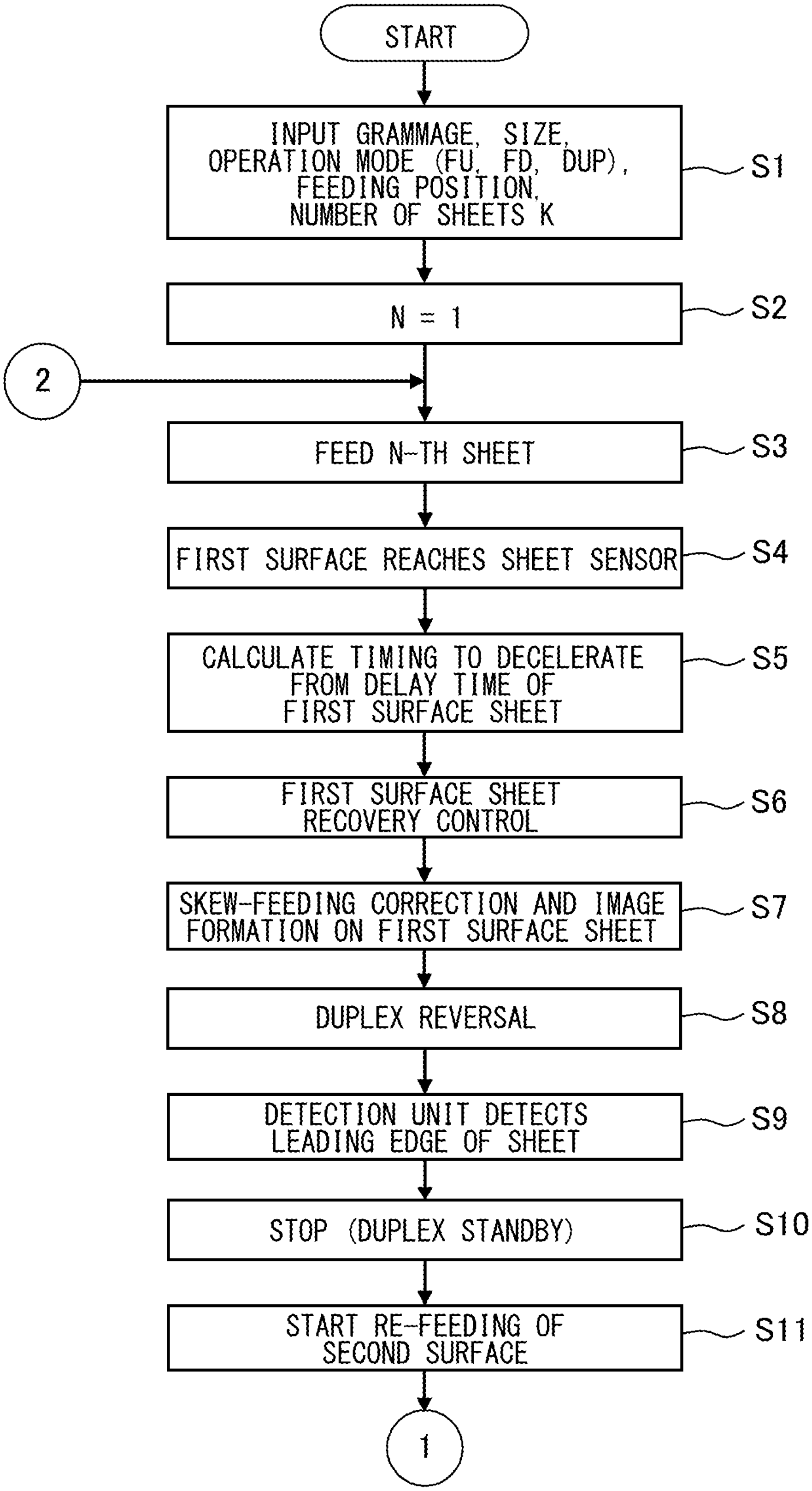
FIG. 6 is a first half of a flowchart illustrating a processing procedure in a case where duplex printing is performed by the image forming system according to the first embodiment.
Figure 7:
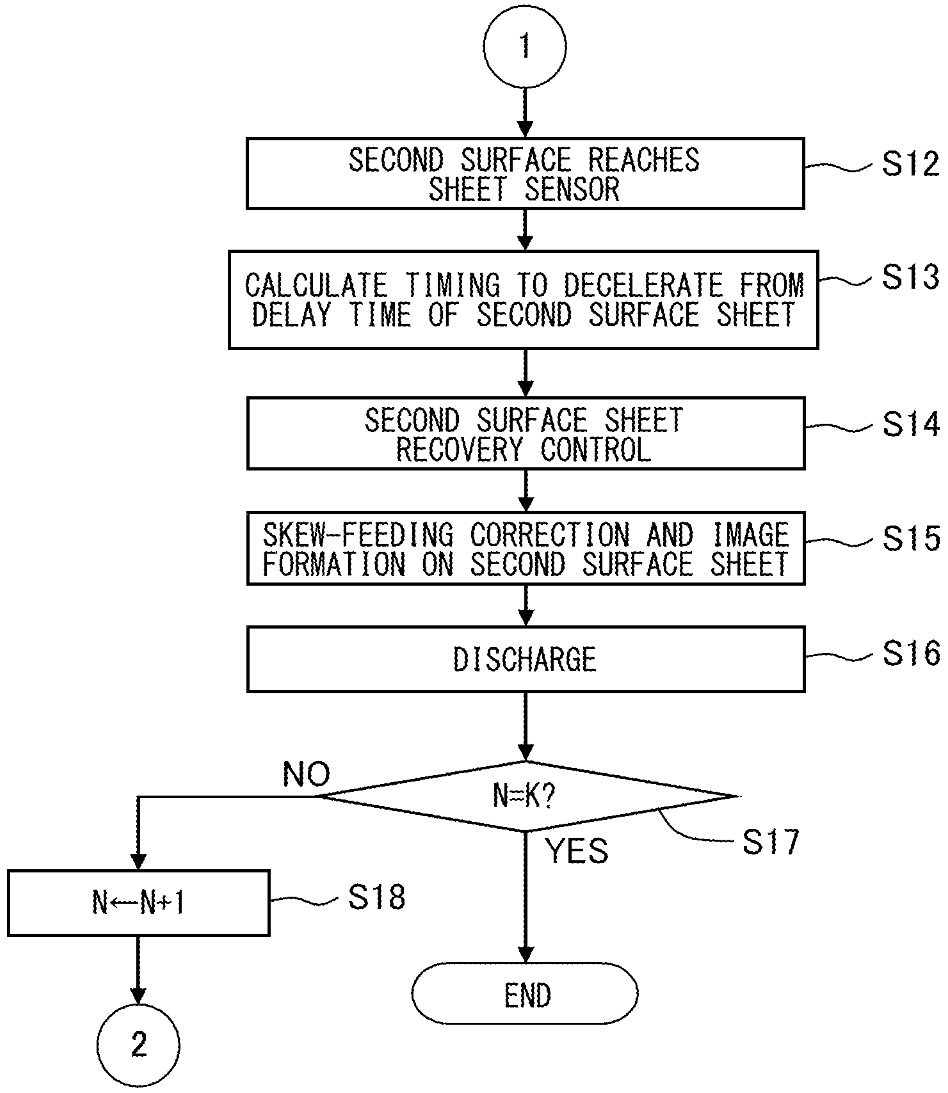
FIG. 7 is a second half of a flowchart illustrating a processing procedure in a case where duplex printing is performed by the image forming system according to the first embodiment.

The control described above will be described with reference to flowcharts illustrated in FIGS. 6 and 7. Here, a description will be given of a case where a sheet fed from the sheet feed unit 53 of the image forming apparatus 1 undergoes image formation of the first surface, passes through the re-conveyance path 54*c*, and undergoes image formation of the second surface, and is discharged.

The grammage, the size, the operation mode, the designation of the feeding position, and the number of sheets K are input by the operation unit 3 (step S1). The operation modes here are, for example, face-up (FU), face-down (FD), and duplex-sheet-passing (DUP). Note that, in the present embodiment, as described above, it is assumed that the operation mode is duplex-sheet-passing (DUP), and the feeding position is set to the sheet cassette 51 of the image forming apparatus 1.

The CPU 61 sets the counter N of the number of printed sheets to 1 (step S2), and feeds the sheet from the sheet feed unit 53 of the image forming apparatus 1 (step S3). At this time, as described above, the sheet is fed in a state of having a delay time occurring when the sheet is attracted to the conveyor belt. When the sheet reaches the sheet sensor 33 (step S4), a signal detected by the sheet sensor 33 is digitally converted by the A/D converter 65 and input to the CPU 61. In the CPU 61, the delay time is calculated from the difference between the timing of reaching the ideal sheet sensor 33 and the detected timing, and the deceleration timing corresponding thereto is calculated (step S5). The CPU 61 notifies the driver 66 of this timing and controls the conveying motor 67 to execute recovery control of the delay time of the sheet (step S6).

The skew correction and the image formation are performed on the sheet (step S7), the sheet conveyed to the reverse conveyance unit 501 is reversed on both sides by switching back (step S8), and the leading edge is detected by the detection unit 4 that detects the leading edge of the sheet provided in the re-conveyance path 54*c* (step S9). Upon detection of the sheet, the CPU 61 temporarily stops the duplex conveying motor 68 in the re-conveyance path 54*c*. Thereafter, standby is performed until re-feeding for performing image formation on the second surface (duplex standby) (step S10), and re-feeding is performed based on the image formation on the second surface (step S11).

When the sheet reaches the sheet sensor 33 again (step S12), a signal detected by the sheet sensor 33 is digitally converted by the A/D converter 65 and input to the CPU 61. The CPU 61 calculates a delay time from the difference between the timing of reaching the ideal sheet sensor 33 and the detected timing, and calculates a deceleration timing corresponding to the delay time (step S13). The CPU 61 notifies the driver 66 of this timing and controls the conveying motor 67 to execute recovery control of the delay time of the sheet (step S14).

The timing of reaching the sheet sensor 33 at the time of duplex re-feeding is set to be later than the time of feeding from the sheet feed unit 53 of the image forming apparatus 1. As a result, by delaying the feeding timing of duplex re-feeding, it is controlled to secure a long duplex standby time, and it is possible to absorb the delay of one turn of the sheet by using the long standby time.

Thereafter, skew correction and image formation are performed on the sheet (step S15), and a discharge operation (step S16) is performed. The CPU 61 determines whether the number of passed sheets is K sheets set in advance (step S17). When determining that the number of passed sheets is K sheets set in advance (YES in step S17), the CPU 61 ends the process. When determining that the number of passed sheets is not K sheets set in advance (NO in step S17), the CPU 61 increments the counter N (step S18), and repeats the operation from step S3 until the number of passed sheets reaches K sheets.

As described above, according to the image forming system 100 of the present embodiment, the timing at which the conveyance of the sheet on which the image is formed on the first surface toward the skew correcting portion 32 is started after the sheet is temporarily stopped in the re-conveyance unit 5 is the first timing Tm13. Therefore, the duplex standby time can be increased as compared with the case where the conveyance is started at the second timing Tm11, so that the occurrence of a jam can be suppressed and the stable conveyance can be realized while securing the productivity.

Second Embodiment

Figure 8:
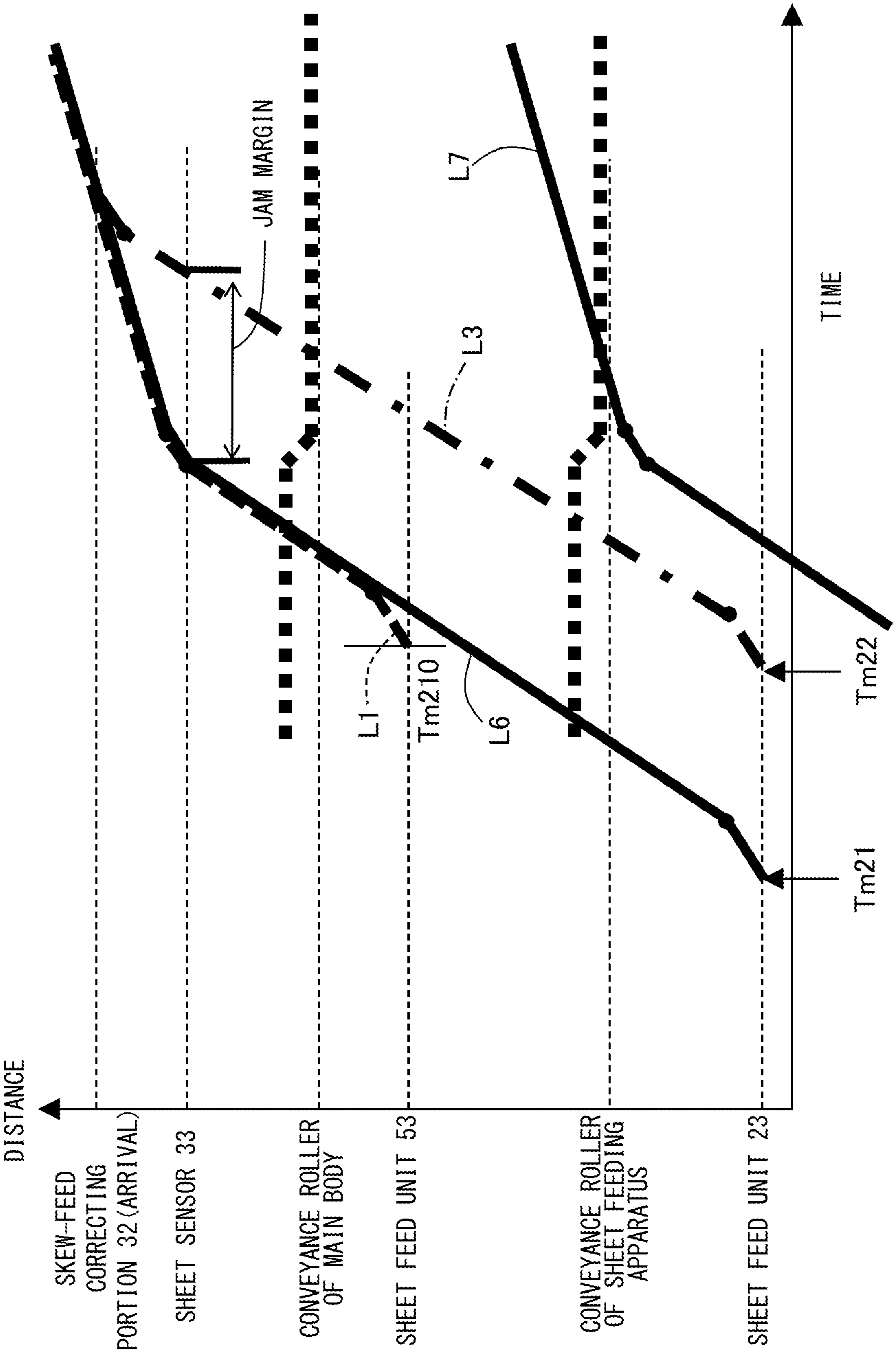
FIG. 8 is a diagram illustrating a conveying distance of a sheet when the sheet is fed from a sheet feed unit of a sheet conveyance apparatus according to the second embodiment, and illustrates a case where the sheet is decelerated before a trailing edge of the sheet leaves a conveyance roller of the sheet conveyance apparatus.

Next, a second embodiment of the present invention will be described in detail with reference to FIGS. 8 to 10. The present embodiment is different from the first embodiment in terms of control when a sheet is fed from the sheet feeding apparatus 2. However, other configurations are the same as those of the first embodiment, and thus the detailed description thereof will be omitted with the same reference numerals. In the present embodiment, the sheet cassette 51 is an example of a first accommodating portion, the conveyance unit 54 is an example of a first conveyance unit, and the feeding path 54*a* is an example of a first conveyance path.

Conventional Problems in Sheet Feeding Apparatus and Control of Present Disclosure The problem of conventional control of a sheet fed from the sheet feeding apparatus 2 and control of the present disclosure will be described. FIG. 8 illustrates a diagram at the time of feeding from the sheet feeding apparatus 2 in the conventional control, and FIG. 9 illustrates a diagram at the time of feeding from the sheet feeding apparatus 2 in the present embodiment. In this drawing, a dotted line is a reference line L1 of the sheet fed from the sheet feed unit 53 of the image forming apparatus 1 described above, a solid line is a diagram of the leading edge and the trailing edge of the sheet fed from the sheet feeding apparatus 2, and a dashed-dotted line is a maximum delay line L3. Here, a solid line L6 is a diagram of the leading edge of the sheet fed from the sheet feeding apparatus 2, and a solid line L7 is a diagram of the trailing edge of the sheet fed from the sheet feeding apparatus 2. Further, a dotted line in the drawing is a diagram schematically representing a change in the rotational speed of each conveyance roller of the image forming apparatus 1 and the sheet feeding apparatus 2. These are superimposed and displayed for comparison.

In the conventional control, the timing Tm21 at which the sheet is fed from the sheet feeding apparatus 2 is set so that the sheet reaches the sheet sensor 33 along the reference line L1 of the sheet fed from the sheet feed unit 53 of the image forming apparatus 1. As a result, the sheet fed from the sheet feed unit 23 of the sheet feeding apparatus 2 is also conveyed to the skew correcting portion 32 in a state of having the same jam margin as the sheet feed unit 53 of the image forming apparatus 1.

In the case of such control, the sheet conveyed without delay decelerates relatively upstream (near the sheet sensor 33) as compared with the case of a sheet conveyed with a delay. Therefore, when a long sheet is passed, deceleration is performed in a state where the trailing edge is nipped by the roller in the sheet feeding apparatus 2. Therefore, it is necessary to synchronously decelerate the motors that drive the rollers of the image forming apparatus 1 and the sheet feeding apparatus 2 (see dotted line in the drawing).

However, in general, it is difficult to control the motors of apparatuses in synchronization due to communication delay or the like, and there is a possibility that speed mismatch occurs. If a speed mismatch occurs and the rotational speed of the conveyance roller of the image forming apparatus 1 becomes slower than the rotational speed of the conveyance roller of the sheet feeding apparatus 2, unexpected bending may occur in the sheet. In this case, the bending is caught by the conveyance guide, so that an excessive load acts on the motor, and the motor may step out. The above is the current problem.

Figure 9:
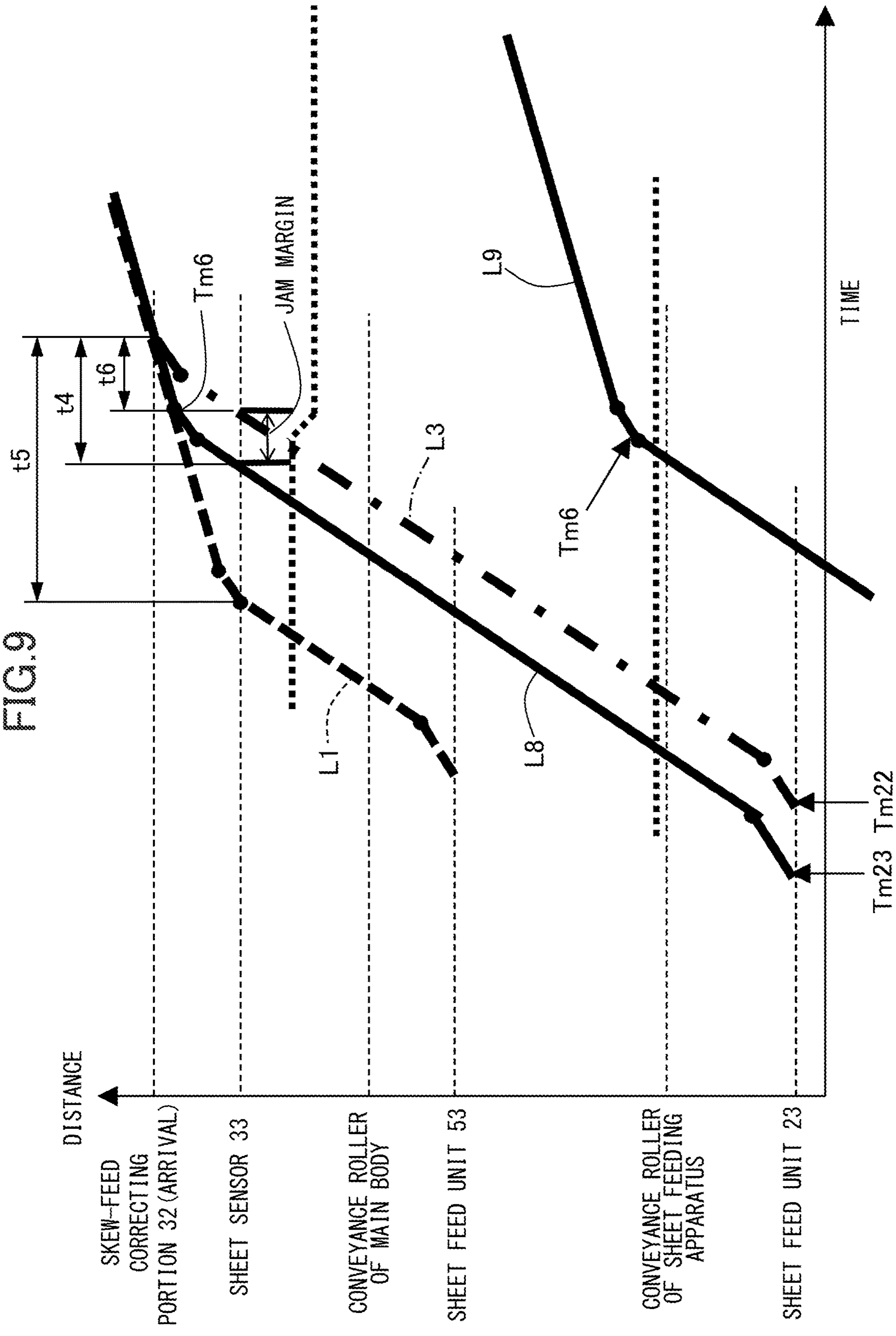
FIG. 9 is a diagram illustrating a conveying distance of a sheet when the sheet is fed from a sheet feed unit of the sheet conveyance apparatus according to the second embodiment, and illustrates a case where the sheet is decelerated after a trailing edge of the sheet leaves a conveyance roller of the sheet conveyance apparatus.
Figure 10:
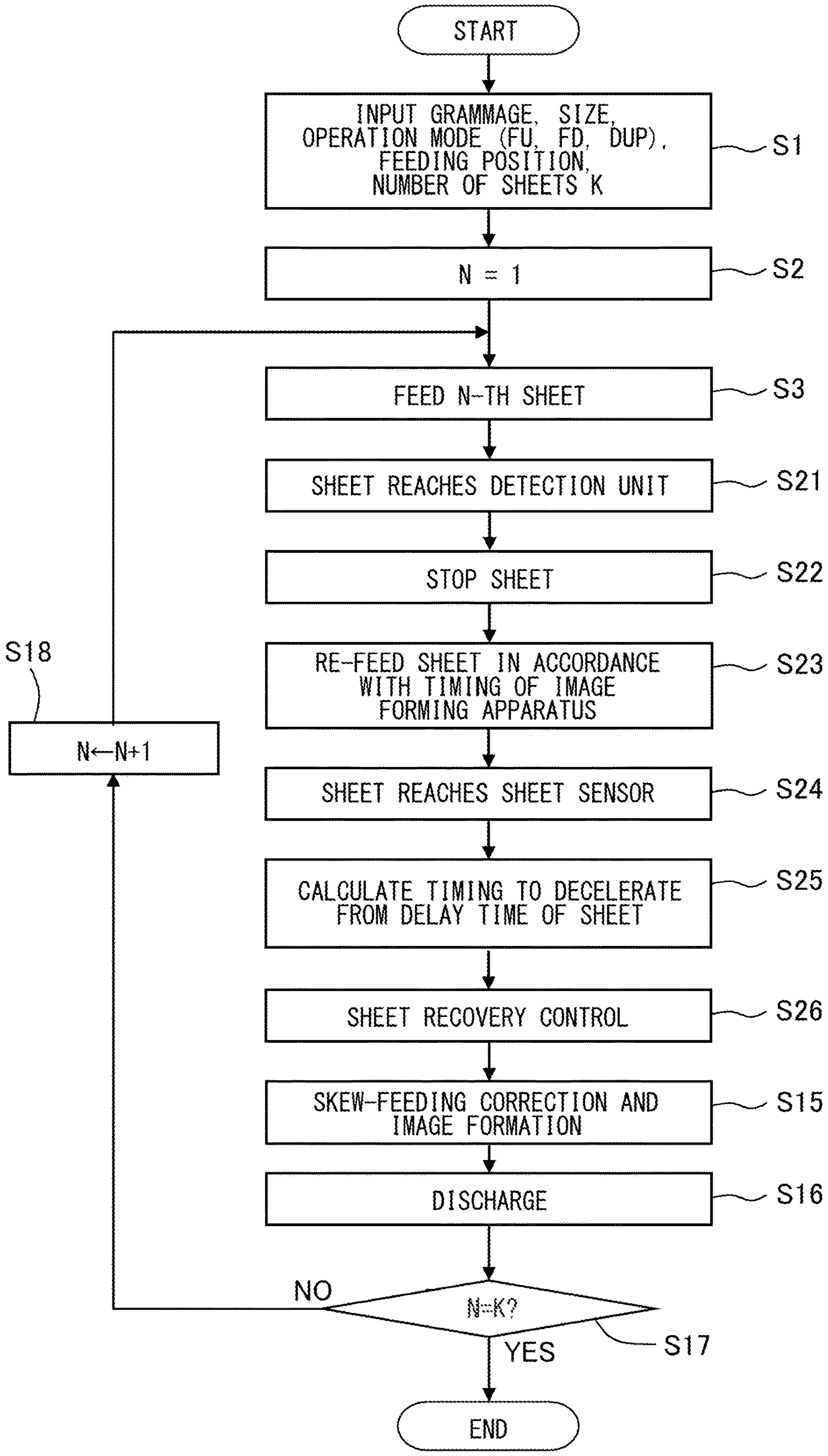
FIG. 10 is a first half of a flowchart illustrating a processing procedure when printing is performed on a sheet fed from a sheet conveyance apparatus by the image forming system according to the second embodiment.

On the other hand, the control of the present embodiment is illustrated in FIG. 9. Here, a solid line L8 is a diagram of the leading edge of the sheet fed from the sheet feeding apparatus 2, and a solid line L9 is a diagram of the trailing edge of the sheet fed from the sheet feeding apparatus 2. In the present embodiment, the timing Tm21 at which the sheet fed from the sheet feeding apparatus 2 reaches the sheet sensor 33 is set later than the timing Tm23 at which the sheet fed from the image forming apparatus 1 reaches the sheet sensor 33.

As a result, the deceleration timing Tm6 is relatively delayed as illustrated in FIG. 9. The deceleration timing Tm6 is set after the trailing edge of the sheet passes through all the conveyance roller pairs 26 of the sheet feeding apparatus 2 even in the maximum size of the sheet. This eliminates the need for the motor driving the conveyance roller of the sheet feeding apparatus 2 to decelerate in synchronization with the conveying motor 67 of the image forming apparatus 1, so that a speed mismatch as in the conventional control does not occur and stable conveyance is performed.

On the other hand, in the case of such control, as described in duplex re-feeding, the jam margin due to the speed control decreases. However, the sheet fed from the sheet feeding apparatus 2 has a characteristic that the sheet delay is small when the sheet is conveyed to the inside of the image forming apparatus 1 because the control of absorbing the delay of the timing in the sheet feeding apparatus 2 is implemented. Therefore, similarly to the duplex re-feeding, the jam margin due to the speed control is reduced, but the delay time of the sheet conveyed from the sheet feeding apparatus 2 is small, so that the overall control is established.

As described above, by relatively advancing the feeding timing from the sheet feed unit 53 of the image forming apparatus 1 having a long delay time, the timing to reach the sheet sensor 33 that measures the delay time is advanced, and the jam margin that can be recovered by the speed control is increased. On the other hand, in the feeding from the sheet feeding apparatus 2 in which the delay time is small and the jam margin due to the speed control is small, the timing of reaching the sheet sensor 33 is delayed by relatively delaying the feeding timing. As a result, it is not necessary to perform the speed control across the apparatuses, and it is possible to avoid the jam caused by the speed mismatch.

Here, the control unit 60 is configured to control the conveyance unit 54 such that the conveyance unit 54 conveys a sheet at the second speed faster than the first speed and decelerates the conveyance speed of the sheet in response to a detection of a leading edge of the sheet by the detection unit 4. Furthermore, in the present embodiment, as illustrated in FIG. 8, the movement represented by the reference line L1 is performed by setting the timing to start the conveyance of the sheet to a fifth timing Tm21 so that the sheet is decelerated and conveyed to the skew correcting portion 32 when the leading edge of the sheet passes through the sheet sensor 33. That is, the fifth timing Tm21 is a timing such that if the sheet is started to convey from the sheet cassette 21 to the feeding path 54*a* at the fifth timing Tm21, the conveyance unit 54 decelerates the conveyance speed of the sheet when the leading edge of the sheet reaches to the detection unit 4 so as to match a conveyance of the sheet with an image formation by the image forming units PY to PK. In addition, the movement represented by the maximum delay line L3 is performed by setting the timing to start the conveyance of the sheet to the fifth timing Tm21 after a sixth timing Tm22 so that the sheet is decelerated when the leading edge of the sheet reaches the skew correcting portion 32 after passing through the sheet sensor 33. That is, the sixth timing Tm22 is a timing such that if the sheet is started to convey from the sheet cassette 21 to the feeding path 54*a* at the sixth timing Tm22, the conveyance unit 54 decelerates the conveyance speed of the sheet when the leading edge of the sheet reaches to the skew correcting portion 32 so as to match a conveyance of the sheet with an image formation by the image forming units PY to PK. Further, as illustrated in FIG. 9, the movement represented by the solid line L8 is performed by setting the timing to start the conveyance of the sheet to the fourth timing Tm23 so that the sheet is decelerated and conveyed to the skew correcting portion 32 before reaching the skew correcting portion 32 after the leading edge of the sheet passes through the sheet sensor 33. The fourth timing Tm23 is after the fifth timing Tm21 and before the sixth timing Tm22. In the present embodiment, the timing of starting conveyance of the sheet conveyed from the sheet feed unit 23 toward the skew correcting portion 32 is set as the fourth timing Tm23, and it is assumed that the timing is after the trailing edge of the sheet conveyed from the sheet feed unit 23 has passed through all the conveyance roller pairs 26. That is, the control unit 60 is configured to control the conveyance unit 22 such that the conveyance unit 22 starts to convey a sheet from the sheet cassette 21 at the fourth timing Tm23 after the fifth timing Tm21, after a rear edge of the sheet conveyed from the sheet cassette 21 passes through the conveyance roller pair 26, and before the sixth timing Tm22.

Furthermore, in the present embodiment, the fourth timing Tm23 is set a predetermined time before the sixth timing Tm22 by the jam margin. As a result, it is possible to secure a jam margin and prepare for an unexpected delay. In addition, in the present embodiment, the timing at which conveyance of the sheet stored in the sheet feed unit 53 toward the skew correcting portion 32 is started is set as the timing Tm210 at which the movement represented by the reference line L1 is performed similarly to the sheet fed from the sheet feed unit 23 at the fifth timing Tm21.

Further, as illustrated in FIG. 9, in a case where the movement represented by the reference line L1 is performed, the time from the time when the leading edge of the sheet passes through the sheet sensor 33, that is, the time when the leading edge is detected by the sheet sensor 33 to the time when the leading edge reaches the skew correcting portion 32 and enters the skew correcting portion 32 is t5. Similarly, in a case where the movement represented by the maximum delay line L3 is performed, the time from the time when the leading edge of the sheet passes through the sheet sensor 33 to the time when the leading edge of the sheet reaches and enters the skew correcting portion 32 is t6. In addition, in a case where the movement represented by the solid line L8 is performed, the time from the time when the leading edge of the sheet passes through the sheet sensor 33 to the time when the leading edge of the sheet reaches and enters the skew correcting portion 32 is t4. In this case, a relationship of $t6<t4<t5t1<t3<t2$ is satisfied, and the jam margin is t4−t6.

The control described above will be described with reference to a flowchart illustrated in FIG. 10. Here, a description will be given of a state where a sheet fed from the sheet feed unit 23 of the sheet feeding apparatus 2 is discharged after image formation. Note that the same processes as in the flowcharts illustrated in FIGS. 6 and 7 are denoted by the same step numbers and will not be described in detail. In addition, in the present embodiment, it is assumed that the operation mode is face-up (FU) or face-down (FD), and the sheet cassette 21 of the sheet feeding apparatus 2 is set as the feeding position.

The CPU 61 feeds a sheet from the sheet feed unit 53 of the image forming apparatus 1 (step S3). At this time, similarly to the inside of the image forming apparatus 1, the sheet is fed in the sheet feeding apparatus 2 in a state of having a delay time occurring when the sheet is attracted to the conveyor belt. When the sheet is conveyed to the horizontal path 24 and reaches the detection unit 25 provided in the horizontal path 24 (step S21), the sheet is temporarily stopped (step S22).

The CPU 61 re-feeds the sheet in accordance with the image forming timing of the image forming apparatus 1 (step S23). As a result, it is possible to correct variations in conveyance timing occurring in the sheet feed unit 23. Thereafter, the sheet is conveyed inside the image forming apparatus 1. When the sheet reaches the sheet sensor 33 (step S24), a signal detected by the sheet sensor 33 is digitally converted by the A/D converter 65 and input to the CPU 61. In the CPU 61, the delay time is calculated from the difference between the ideal timing of reaching the sheet sensor 33 and the detected timing, and the deceleration timing corresponding thereto is calculated (step S25). This timing is notified to the driver 66, and the conveying motor 67 is controlled to recover the delay time of the sheet (step S26). Note that this recovery control in the image forming apparatus 1 mainly recovers a delay from the sheet feeding apparatus 2 to the sheet sensor 33 of the image forming apparatus 1.

The timing of reaching the sheet sensor 33 at the time of feeding from the sheet feeding apparatus 2 is set to be later than the time of feeding from the sheet feed unit 53 of the image forming apparatus 1. Accordingly, by delaying the feeding timing of the sheet feeding apparatus 2, it is possible to delay the timing at which the sheet is decelerated. As a result, deceleration is performed after the trailing edge of the sheet leaves the conveyance roller pair 26 provided in the sheet feeding apparatus 2. For this reason, the motor that drives the conveyance roller pair 26 of the sheet feeding apparatus 2 does not need to decelerate in synchronization with the conveying motor 67 of the image forming apparatus 1, so that it is possible to prevent a speed mismatch.

As described above, according to the image forming system 100 of the present embodiment, the timing of starting conveyance of the sheet S conveyed from the sheet cassette 21 toward the skew correcting portion 32 is the fourth timing Tm23. Further, this timing is a timing after the trailing edge of the sheet S conveyed from the sheet cassette 21 passes through all the conveyance roller pairs 26. Therefore, since the speed of the roller on the main body side can be reduced in a state where the trailing edge of the sheet is not nipped by the conveyance roller pair 26 of the sheet feeding apparatus 2, it is possible to suppress the occurrence of the jam and realize stable conveyance while securing productivity.

Third Embodiment

Next, a third embodiment of the present invention will be described in detail with reference to FIGS. 11 to 15. The present embodiment is different from the first embodiment in that the skew correcting portion 32 stops the sheet S to correct skew. In the present embodiment, the means for recovering the delay in the sheet feed unit is temporarily stopped before the skew correction instead of the speed control, and is resumed in accordance with the image forming timing again. In this embodiment, since the means is temporarily stopped before the skew correction, the high productivity is lower than that in the first embodiment, but the control can be simplified. In addition, the skew correcting portion 32 according to the present embodiment stops the sheet S when the leading edge of the sheet S abuts thereon, and corrects the skew of the sheet conveyed through the feeding path 54*a*. However, other configurations are the same as those of the first embodiment, and thus the detailed description thereof will be omitted with the same reference numerals.

Stop Control

First, stop control, which is a feature of the present embodiment, will be described. In the first embodiment, the delay in the sheet feed unit is recovered by the speed control. On the other hand, in the control of the present embodiment, the conveyance is temporarily stopped before the skew correction (pre-registration stop), and then the conveyance is resumed at the timing of image formation again.

Figure 11:
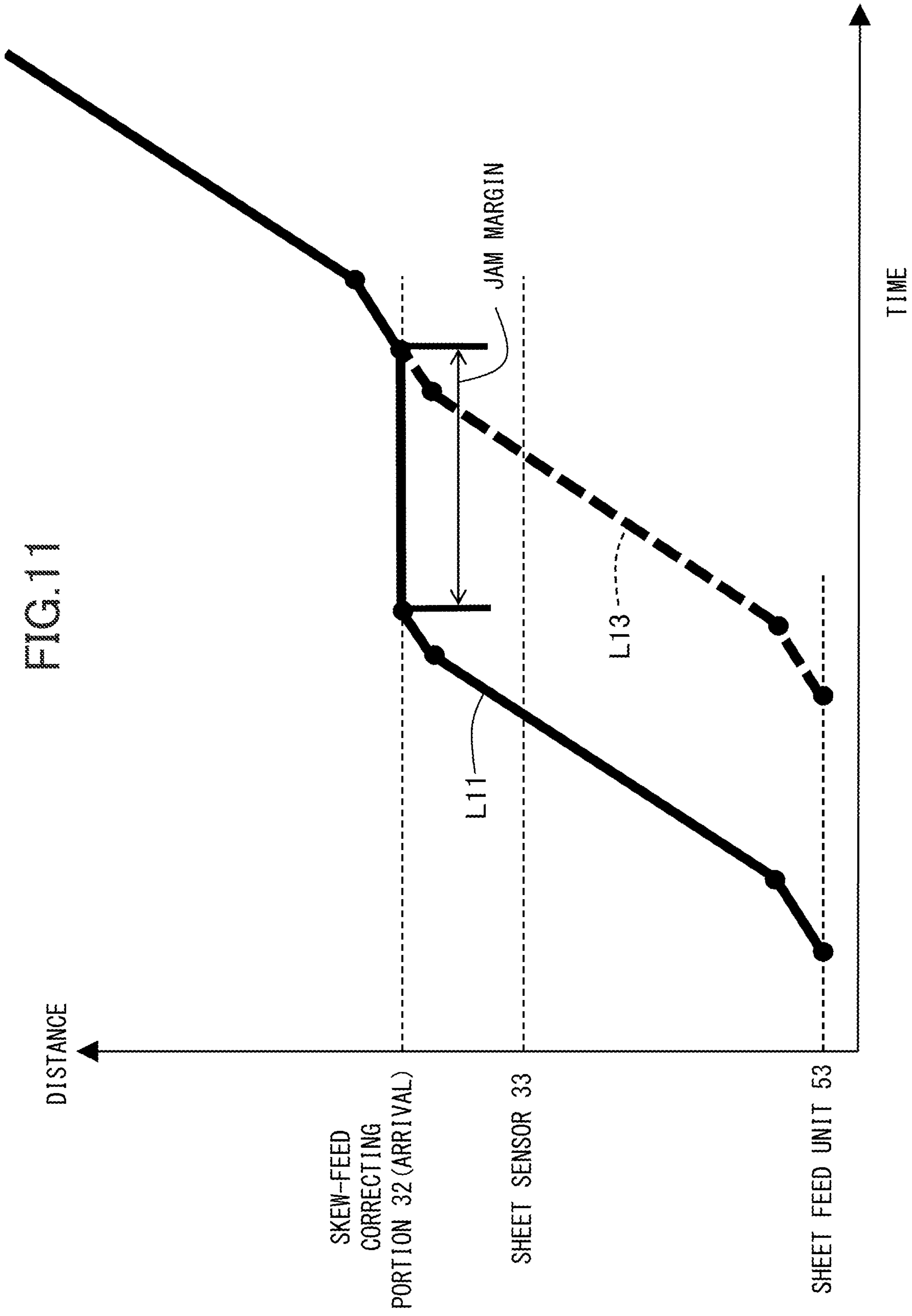
FIG. 11 is a diagram illustrating a conveying distance of a sheet when the sheet is fed from a sheet feed unit of an image forming apparatus according to a third embodiment.

FIG. 11 illustrates the reference line L11 (solid line) and the maximum delay line L13 (broken line) when there is no delay. As illustrated in the drawing, when the sheet sensor 33 detects the leading edge of the sheet fed from the sheet feed unit 53 of the image forming apparatus 1, the sheet is temporarily stopped upstream of the skew correcting portion 32. Then, the conveyance is resumed in accordance with the image forming timing again, and it is necessary to secure a time during which the delay in the sheet feed unit can be recovered as the stop time. That is, when a delay occurs in the sheet feed unit as indicated by the maximum delay line L13 in FIG. 11, the timing of reaching the stop position is delayed. However, if the delay is within the stop time, the delay in the sheet feed unit can be recovered since the conveyance can be resumed in time. This stop time is referred to as a jam margin, and a stop time for absorbing the maximum delay amount in the sheet feed unit is required.

Conventional Problems in Duplex Conveyance and Control of Present Disclosure

Figure 12:
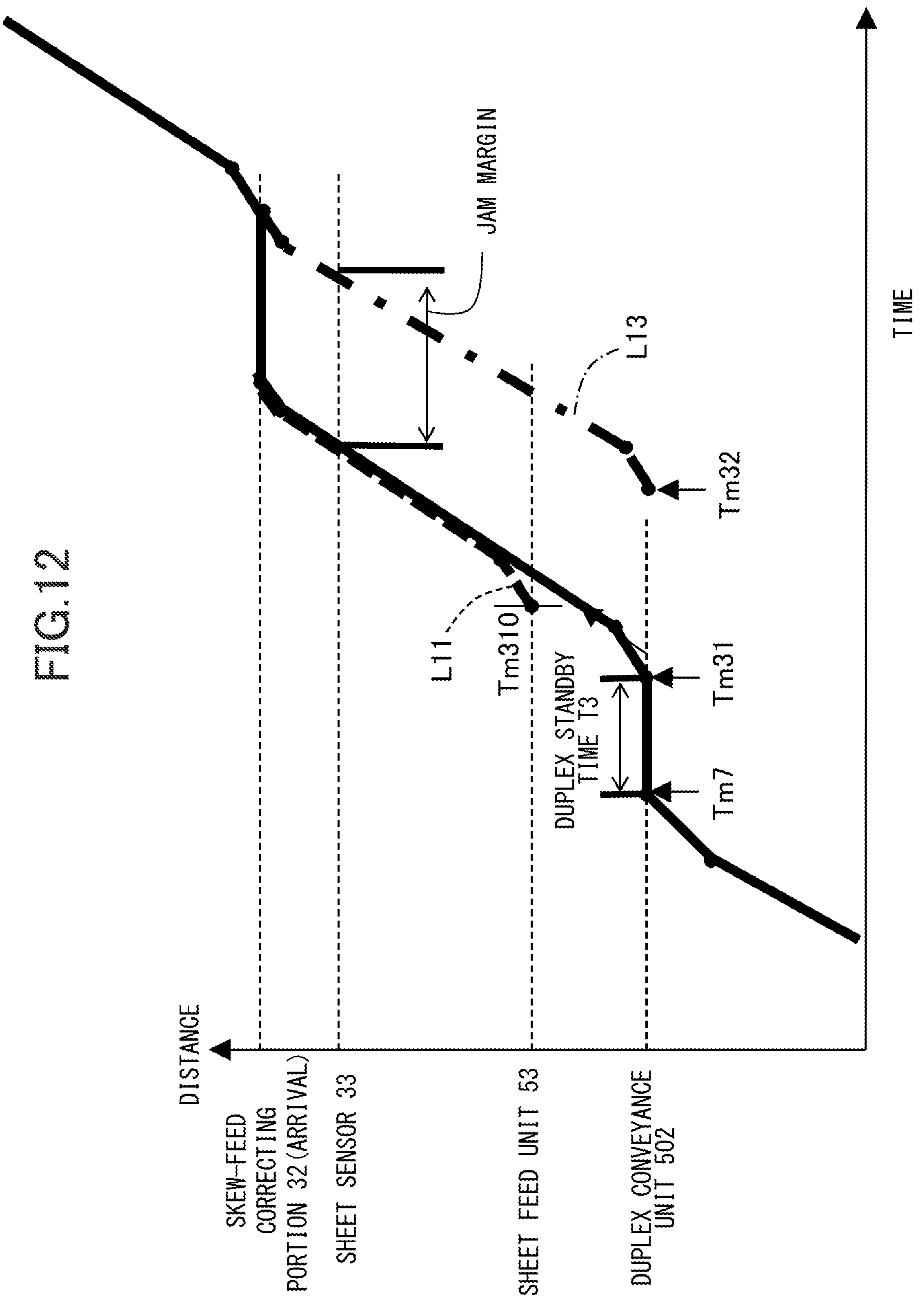
FIG. 12 is a diagram illustrating a conveying distance of a sheet in a case where a sheet is re-fed from a duplex conveyance unit of an image forming apparatus according to a third embodiment, and illustrates a case where a duplex standby time is short.
Figure 13:
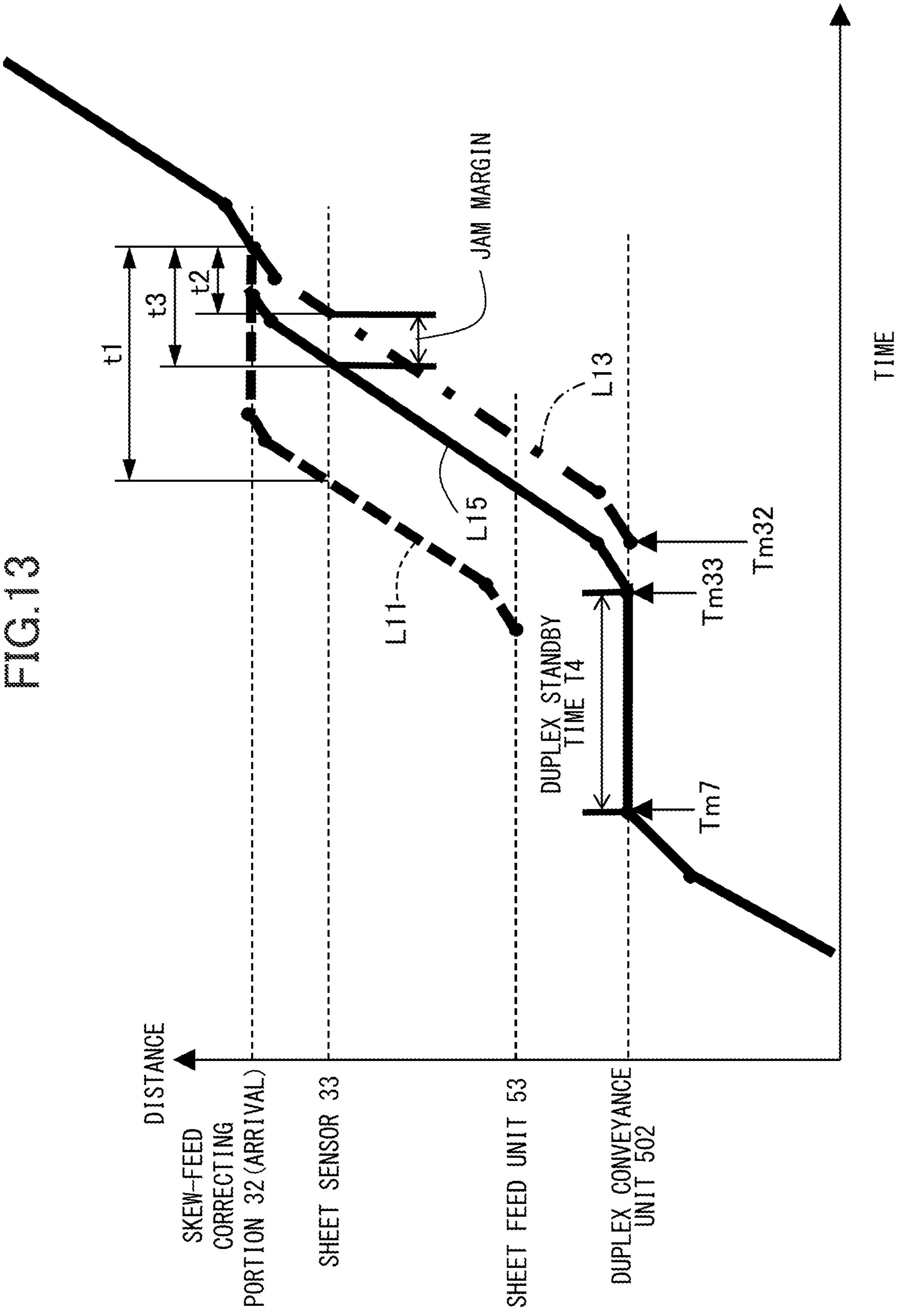
FIG. 13 is a diagram illustrating a conveying distance of a sheet in a case where a sheet is re-fed from a duplex conveyance unit of the image forming apparatus according to the third embodiment, and is a diagram in a case where a duplex standby time is long.

FIG. 12 shows a diagram during duplex conveyance in the conventional configuration, and FIG. 13 shows a diagram during duplex conveyance in the present embodiment. In this drawing, a broken line is a reference line L11 of the sheet fed from the sheet feed unit 53 of the image forming apparatus 1, a solid line is a diagram at the time of duplex re-feeding, and a dashed-dotted line is a maximum delay line L13. These are superimposed and displayed for comparison.

The conventional control has the same problem as the first embodiment. That is, since the sheet is fed at a timing at which an image is appropriately formed on the sheet, the timing Tm31 at which the sheet is re-fed from the duplex conveyance unit 502 is a timing that is determined naturally when an image forming operation is performed. On the other hand, the timing Tm7 is a timing at which the image of the first surface is formed, the sheet is reversed and conveyed around the inside of the apparatus via the re-conveyance path 54*c*, the leading edge of the sheet is detected by the detection unit 4, and the sheet is temporarily stopped in the re-conveyance path 54*c*. Thereafter, the sheet is stopped and stands by until the sheet is re-fed. The stopping time is referred to as a duplex standby time T3.

If the sheet having made one turn inside the apparatus does not meet the re-feeding timing Tm31 in the duplex conveyance unit 502, the re-feeding may not be performed and a jam may occur. Therefore, in order to meet the re-feeding timing Tm31 even in a case where the sheet having made one turn inside the apparatus is delayed and reaches the re-conveyance path 54*c*, the duplex standby time T3 needs to be secured in advance to be equal to or longer than the maximum delay time of the sheet having made one turn inside the apparatus. As described above, in the case of duplex printing, it is important to secure the duplex standby time T3, but it can be said that it is difficult to secure this time in order to achieve high productivity. This is because, since the timing Tm31 is set in time for image formation, it is desired to advance the re-feeding timing Tm31 in order to achieve high productivity, and this is contrary to securing the duplex standby time T3. The above is the current problem.

On the other hand, the present embodiment realizes a configuration for securing the duplex standby time T4 while maintaining high productivity, which will be described with reference to FIG. 13. Here, attention is focused on duplex re-feeding timing. In the conventional control, the duplex re-feeding timing is controlled so that the sheet is conveyed to the sheet sensor 33 that detects the delay time at the same timing as the sheet feed unit 53 of the image forming apparatus 1. As a result, the jam margin of the sheet fed from the sheet feed unit 53 and the duplex conveyance unit 502 of the image forming apparatus 1 can be uniformly secured by the same amount. However, the sheet conveyed from the duplex conveyance unit 502 has a characteristic of having a shorter delay time than the sheet conveyed from the sheet feed unit 53 of the image forming apparatus 1. The reason is the same as that described in the first embodiment.

By relatively advancing the feeding timing from the sheet feed unit 53 of the image forming apparatus 1 having a large delay time, the timing to reach the sheet sensor 33 that measures the delay time is advanced, and the jam margin that can be recovered by the speed control is increased. On the other hand, in the re-feeding from the duplex conveyance unit 502 in which the delay time is short and the jam margin due to the speed control is small, by relatively delaying the feeding timing, the timing of reaching the sheet sensor 33 is delayed. As a result, it is possible to secure a longer duplex standby time T4 than the duplex standby time T3 of the conventional control, and it is possible to prevent a jam in which a sheet that has made one turn does not meet re-feeding from the duplex conveyance unit 502.

Here, in the present embodiment, as illustrated in FIG. 12, the conveyance of the sheet S is started so that the leading edge of the sheet reaches the skew correcting portion 32 after passing through the sheet sensor 33, and enters the skew correcting portion 32 after being temporarily stopped. By setting the conveyance start timing to the first timing Tm31, the movement represented by the reference line L11 is performed. Further, the conveyance of the sheet S is started so that the leading edge of the sheet reaches the skew correcting portion 32 after passing through the sheet sensor 33 later than the sheet reaching the skew correcting portion 32 when the conveyance is started at the first timing Tm31, and enters the skew correcting portion 32 without being temporarily stopped. By setting the conveyance start timing to the second timing Tm32, the movement represented by the maximum delay line L13 is performed. Furthermore, as illustrated in FIG. 13, the conveyance of the sheet S is started so that the leading edge of the sheet reaches the skew correcting portion 32 after passing through the sheet sensor 33, and enters the skew correcting portion 32 after being temporarily stopped. Here, the timing is set to a timing after the sheet reaching the skew correcting portion 32 when the conveyance is started at the first timing Tm31 and before the sheet reaching the skew correcting portion 32 when the conveyance is started at the second timing. By setting this timing as the third timing Tm33, the movement represented by the duplex line L15 is performed. In the present embodiment, the timing at which the re-conveyance unit 5 temporarily stops the sheet on which the image is formed in the image forming engine 10 and then starts conveyance toward the skew correcting portion 32 is set as the third timing Tm33.

Furthermore, in the present embodiment, the third timing Tm33 is set a predetermined time before the second timing Tm32 by the jam margin. As a result, it is possible to secure a jam margin and prepare for an unexpected delay. In the present embodiment, the timing at which the conveyance of the sheet stored in the sheet feed unit 53 toward the skew correcting portion 32 is started is set as the timing Tm310 at which the movement represented by the reference line L11 is performed similarly to the sheet fed from the duplex conveyance unit 502 at the first timing Tm31.

Further, as illustrated in FIG. 13, in the case of the movement represented by the reference line L1 is performed, the time from the time when the leading edge of the sheet passes through the sheet sensor 33, that is, the time when the leading edge of the sheet is detected by the sheet sensor 33 to the time when the leading edge of the sheet enters the skew correcting portion 32 is t1. Similarly, in a case where the movement represented by the maximum delay line L3 is performed, the time from the time when the leading edge of the sheet passes through the sheet sensor 33 to the time when the sheet enters the skew correcting portion 32 is t2. In addition, in a case where the movement represented by the duplex line L15 is performed, the time from the time when the leading edge of the sheet passes through the sheet sensor 33 to the time when the sheet enters the skew correcting portion 32 is t3. In this case, a relationship of $t1>t3>t2$ is satisfied, and the jam margin is $t3-t2$.

Figure 14:
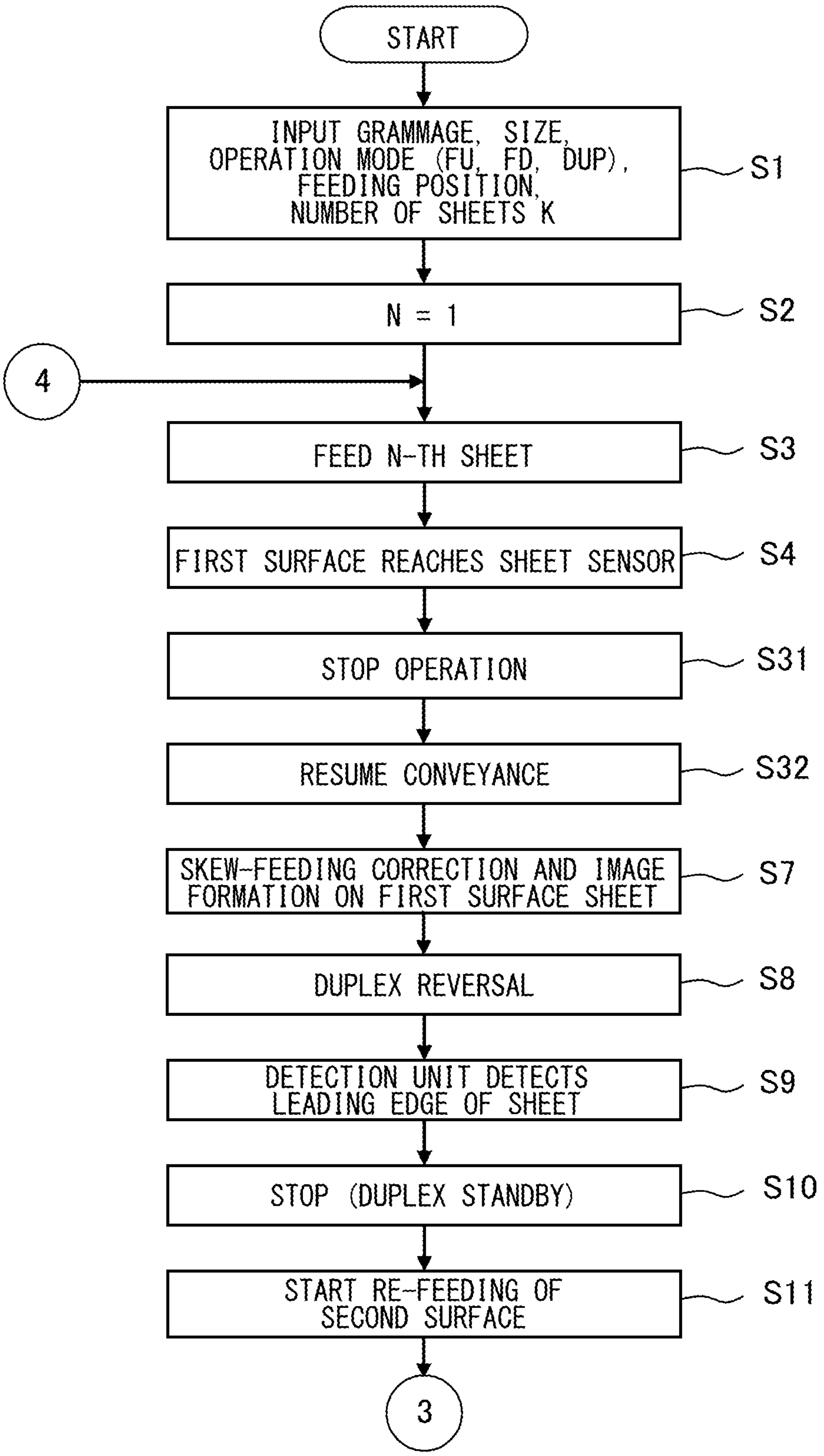
FIG. 14 is a first half of a flowchart illustrating a processing procedure in a case where duplex printing is performed by the image forming system according to the third embodiment.
Figure 15:
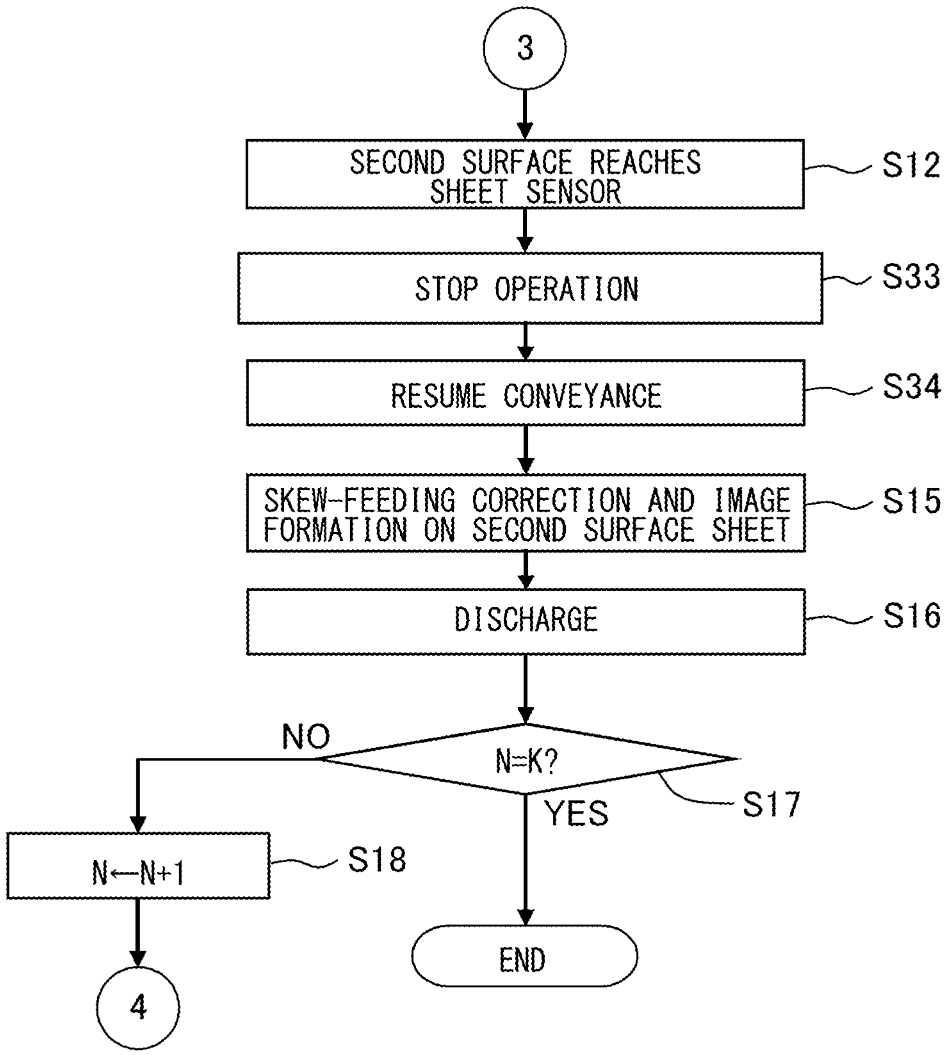
FIG. 15 is a second half of a flowchart illustrating a processing procedure in a case where duplex printing is performed by the image forming system according to the third embodiment.

The control described above will be described with reference to flowcharts illustrated in FIGS. 14 and 15. Here, a description will be given of a case where a sheet fed from the sheet feed unit 53 of the image forming apparatus 1 undergoes image formation of the first surface, passes through the re-conveyance path 54*c*, and undergoes image formation of the second surface, and is discharged. Note that the same processes as in the flowcharts illustrated in FIGS. 6 and 7 are denoted by the same step numbers and will not be described in detail.

In the CPU 61, when the sheet fed from the sheet feed unit 53 of the image forming apparatus 1 reaches the sheet sensor 33 (step S4), a signal detected by the sheet sensor 33 is digitally converted by the A/D converter 65 and input to the CPU 61. A predetermined time is counted in the CPU 61, the sheet is conveyed to the stop position, and the stop operation is executed (step S31). The CPU 61 resumes the conveyance based on the timing of image formation (step S32), and skew correction and image formation are performed (step S7).

Similarly, when the sheet fed from the duplex conveyance unit 502 reaches the sheet sensor 33 (step S12), a signal detected by the sheet sensor 33 is digitally converted by the A/D converter 65 and input to the CPU 61. A predetermined time is counted in the CPU 61, the sheet is conveyed to the stop position, and the stop operation is executed (step S33). The CPU 61 resumes the conveyance based on the timing of image formation (step S34), and skew correction and image formation are performed (step S15).

As described above, according to the image forming system 100 of the present embodiment, the timing at which the conveyance of the sheet on which the image is formed on the first surface toward the skew correcting portion 32 is started after the sheet is temporarily stopped in the re-conveyance unit 5 is set as the third timing Tm33. Therefore, the duplex standby time can be increased as compared with the case where the conveyance is started at the first timing Tm31, so that the occurrence of the jam can be suppressed and the stable conveyance can be realized while securing the productivity.

In the present embodiment, the skew correcting portion 32 is a sheet alignment device of a side registration system including a reference member and, for example, three obliquely conveyance rollers, but the present invention is not limited thereto. For example, the skew may be corrected by causing a sheet to abut against a roller pair or a shutter to form a loop.

In addition, in the present embodiment, the case where the control in which the sheet reaches the skew correcting portion 32 and is temporarily stopped is applied to the sheet fed from the duplex conveyance unit 502 has been described, but the present invention is not limited thereto, and the present invention can also be applied to a case where the sheet is fed from the sheet feeding apparatus 2. However, if the position where the pre-registration is stopped is a position where the sheet leaves the conveyance roller pair 26 in the sheet feeding apparatus 2, it is not necessary to control the timing of reaching the sheet sensor 33.

According to the image forming apparatus and the image forming system according to the present invention, it is possible to realize stable conveyance while suppressing occurrence of a jam while securing productivity.

In each of the above-described embodiments, a case where the present invention is applied to the image forming system 100 including the image forming apparatus 1 and the sheet feeding apparatus 2 has been described, but the present invention is not limited thereto, and may be applied to only the image forming apparatus 1 capable of duplex printing. Furthermore, in each of the above-described embodiments, the case where the control unit 60 is provided in the image forming apparatus 1 has been described, but the present invention is not limited thereto, and for example, a host computer or the like connected to the image forming system 100 may be the control unit.

The present invention can also be realized by processing in which a program for realizing one or more functions of the above-described embodiments is supplied to a system or an apparatus via a network or a storage medium, and one or more processors in a computer of the system or the apparatus read and execute the program. The present invention can also be implemented by a circuit (for example, ASIC) that implements one or more functions.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-080160, filed May 16, 2022 which is hereby incorporated by reference herein in its entirety.

What is claimed is:

1. An image forming apparatus comprising:

an accommodating portion configured to accommodate a sheet;

an image forming unit configured to form an image on a sheet;

a skew correcting portion disposed in a first conveyance path of sheet toward the image forming unit and configured to correct a skew of a sheet while conveying the sheet at a first conveying speed;

a conveyance unit disposed between the accommodating portion and the skew correcting portion in the first conveyance path and configured to convey a sheet to the skew correcting portion;

a detection unit disposed between the accommodating portion and the skew correcting portion in the first conveyance path and configured to detect a sheet conveyed in the first conveyance path;

a re-conveyance unit configured to convey a sheet on which an image is formed by the image forming unit in a second conveyance path joining to a portion between the detection unit and the accommodating portion in the first conveyance path while reversing front and back surfaces of the sheet; and a control unit configured to control a conveyance speed of a sheet by the conveyance unit and the re-conveyance unit, wherein the control unit is configured to control the conveyance unit such that the conveyance unit conveys a sheet at a second conveying speed faster than the first conveying speed and decelerates the conveyance speed of the sheet in response to a detection of a leading edge of the sheet by the detection unit, and wherein the control unit is configured to control the re-conveyance unit such that the re-conveyance unit stops a sheet on which an image is formed by the image forming unit in the second conveyance path temporarily and starts to convey the sheet at a first timing after a second timing and before a third timing, where the second timing is a timing such that if the sheet stopped in the second conveyance path temporarily is started to convey to the first conveyance path at the second timing, the conveyance unit decelerates the conveyance speed of the sheet when a leading edge of the sheet reaches to the detection unit so as to match a conveyance of the sheet with an image formation by the image forming unit, and the third timing is a timing such that if the sheet stopped in the second conveyance path temporarily is started to convey to the first conveyance path at the third timing, the conveyance unit decelerates the conveyance speed of the sheet when a leading edge of the sheet reaches to the skew correcting portion so as to match a conveyance of the sheet with an image formation by the image forming unit.

2. The image forming apparatus according to claim 1, wherein the control unit is configured to set the first timing before a predetermined time from the third timing.

3. The image forming apparatus according to claim 1, wherein the control unit is configured to start to convey a sheet from the accommodating portion toward the skew correcting portion at a timing such that if the sheet accommodated in the accommodating portion is started to convey to the first conveyance path at the timing, the conveyance unit decelerates the conveyance speed of the sheet when a leading edge of the sheet reaches to the detection unit so as to match a conveyance of the sheet with an image formation by the image forming unit.

4. The image forming apparatus according to claim 1, wherein the re-conveyance unit includes a reverse path configured to reverse front and back surfaces of a sheet and joining to the second conveyance path.

5. The image forming apparatus according to claim 1, wherein the control unit is configured to control the re-conveyance unit such that the re-conveyance unit stops the sheet on which an image is formed by the image forming unit in the second conveyance path temporarily before the second timing.

6. The image forming apparatus according to claim 1, wherein a relation of $t3<t1<t2$ is satisfied, where t1 is a time from a timing when a leading edge of a sheet reaches the detection unit to a timing when the leading edge of the sheet reaches the skew correcting portion in a case where a conveyance of the sheet by the re-conveyance unit is started at the first timing, t2 is a time from a timing when a leading edge of a sheet reaches the detection unit to a timing when the leading edge of the sheet reaches the skew correcting portion in a case where a conveyance of the sheet by the re-conveyance unit is started at the second timing, and t3 is a time from a timing when a leading edge of a sheet reaches the detection unit to a timing when the leading edge of the sheet reaches the skew correcting portion in a case where a conveyance of the sheet by the re-conveyance unit is started at the third timing.

7. The image forming apparatus according to claim 1, wherein the image forming unit includes an image bearing member configured to bear an image, and a transfer unit configured to transfer the image on the image bearing member to a sheet, and wherein the first timing, the second timing, and the third timing are timings such that the conveyance unit decelerates the conveyance speed of the sheet so as to match a conveyance of the sheet with an image transfer to the sheet by the transfer unit.

8. An image forming system comprising:

an image forming apparatus including a first accommodating portion configured to accommodate a sheet, an image forming unit configured to form an image on a sheet, a skew correcting portion disposed in a first conveyance path of sheet toward the image forming unit and configured to correct a skew of a sheet while conveying the sheet at a first conveying speed, a first conveyance unit disposed between the first accommodating portion and the skew correcting portion in the first conveyance path and configured to convey a sheet to the skew correcting portion, and a detection unit disposed between the first accommodating portion and the skew correcting portion in the first conveyance path and configured to detect a sheet conveyed in the first conveyance path;

a feeding apparatus including a second accommodating portion configured to accommodate a sheet, and a second conveyance unit including a conveyance roller pair configured to convey a sheet in a third conveyance path joining to a portion between the detection unit and the first accommodating portion in the first conveyance path; and a control unit configured to control a conveying speed of the sheet by the first conveyance unit, and the second conveyance unit, wherein the control unit is configured to control the first conveyance unit such that the first conveyance unit conveys a sheet at a second conveying speed faster than the first conveying speed and decelerates a conveyance speed of the sheet in response to a detection of a leading edge of the sheet by the detection unit, and wherein the control unit is configured to control the second conveyance unit such that the second conveyance unit starts to convey a sheet from the second accommodating portion at a fourth timing after a fifth timing, after a rear edge of the sheet conveyed from the second accommodating portion passes through the conveyance roller pair, and before a sixth timing, where the fifth timing is a timing such that if the sheet is started to convey from the second accommodating portion to the first conveyance path at the fifth timing, the first conveyance unit decelerates the conveyance speed of the sheet when a leading edge of the sheet reaches to the detection unit so as to match a conveyance of the sheet with an image formation by the image forming unit, and the sixth timing is a timing such that if the sheet is started to convey from the second accommodating portion to the first conveyance path at the sixth timing, the first conveyance unit decelerates the conveyance speed of the sheet when a leading edge of the sheet reaches to the skew correcting portion so as to match a conveyance of the sheet with an image formation by the image forming unit.

9. The image forming system according to claim 8, wherein the control unit is configured to set the fourth timing before a predetermined time from the sixth timing.

10. The image forming system according to claim 8, wherein the control unit is configured to start to convey a sheet from the first accommodating portion toward the skew correcting portion at a timing such that if the sheet accommodated in the first accommodating portion is started to convey to the first conveyance path at the timing, the first conveyance unit decelerates the conveyance speed of the sheet when a leading edge of the sheet reaches to the detection unit so as to match a conveyance of the sheet with an image formation by the image forming unit.

11. The image forming system according to claim 8, wherein a relation of t5<t4<t6 is satisfied, where t4 is a time from a timing when a leading edge of a sheet reaches the detection unit to a timing when the leading edge of the sheet reaches the skew correcting portion in a case where a conveyance of the sheet by the second conveyance unit is started at the fourth timing, t5 is a time from a timing when a leading edge of a sheet reaches the detection unit to a timing when the leading edge of the sheet reaches the skew correcting portion in a case where a conveyance of the sheet by the second conveyance unit is started at the fifth timing, and t6 is a time from a timing when a leading edge of a sheet reaches the detection unit to a timing when the leading edge of the sheet reaches the skew correcting portion in a case where a conveyance of the sheet by the second conveyance unit is started at the sixth timing.

12. The image forming system according to claim 8,

Wherein the image forming unit includes an image bearing member configured to bear an image, and a transfer unit configured to transfer the image on the image bearing member to a sheet, and wherein the fourth timing, the fifth timing, and the sixth timing are timings such that the first conveyance unit decelerates the conveyance speed of the sheet so as to match a conveyance of the sheet with an image transfer to the sheet by the transfer unit.

* * * * *